US008880728B2

(12) United States Patent
Winchester et al.

(10) Patent No.: US 8,880,728 B2
(45) Date of Patent: Nov. 4, 2014

(54) HIGH SPEED ETHERNET MAC AND PHY APPARATUS WITH A FILTER BASED ETHERNET PACKET ROUTER WITH PRIORITY QUEUING AND SINGLE OR MULTIPLE TRANSPORT STREAM INTERFACES

(75) Inventors: Neil Winchester, Dix Hills, NY (US); Paul Brant, Pelham, NY (US); William Chiechi, Port Jefferson, NY (US); Charles Forni, Setauket, NY (US); Anthony Tarascio, Franklin Square, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 245 days.

(21) Appl. No.: 13/607,022

(22) Filed: Sep. 7, 2012

(65) Prior Publication Data

US 2013/0010795 A1  Jan. 10, 2013

Related U.S. Application Data

(62) Division of application No. 11/046,292, filed on Jan. 28, 2005, now Pat. No. 8,281,031.

(51) Int. Cl.
| | |
|---|---|
| *G06F 15/173* | (2006.01) |
| *H04L 12/64* | (2006.01) |
| *H04L 12/46* | (2006.01) |
| *H04L 12/853* | (2013.01) |
| *H04L 12/701* | (2013.01) |

(52) U.S. Cl.
CPC ............ *H04L 45/00* (2013.01); *H04L 12/6418* (2013.01); *H04L 12/4633* (2013.01); *H04L 47/2416* (2013.01)
USPC .......................................................... 709/238

(58) Field of Classification Search
None
See application file for complete search history.

(56) References Cited

U.S. PATENT DOCUMENTS

| | | | |
|---|---|---|---|
| 5,598,581 | A | 1/1997 | Daines et al. |
| 5,948,069 | A | 9/1999 | Kitai et al. |

(Continued)

FOREIGN PATENT DOCUMENTS

| | | |
|---|---|---|
| JP | 2004336437 | 11/2004 |
| JP | 2005341107 | 12/2005 |

(Continued)

OTHER PUBLICATIONS

Taifatech, Inc., "TF-530 Digital TV Steaming Controller," Product Brief, Oct. 27, 2004, http://www.taifatech.com.tw/, pp. 1-2.

(Continued)

*Primary Examiner* — Brian P Whipple
(74) *Attorney, Agent, or Firm* — King & Spalding L.L.P.

(57) ABSTRACT

An audio-visual content delivery system includes an interface to communicate with a local area network (LAN). A packet processing circuit in the system may filter and route Ethernet packet data received from the LAN, to specific ports and/or queues without host processor intervention. The packet processing circuit may utilize a set of filter and routing mechanisms configurable in hardware to interpret various Internet Engineering Task Force networking transport protocols, and may transfer the packet data in a format recognized by a variety of consumer subsystems, each of which may be coupled to the packet processing circuit. The packet processing circuit may be implemented as a semiconductor device, and may allow encapsulated application data to be routed to a plurality of different types of application sinks or processors, forming a point-to-point or multi-point serial or parallel data stream over a standard transport covering numerous levels of the ISO data communications stack.

8 Claims, 20 Drawing Sheets

(56) References Cited

U.S. PATENT DOCUMENTS

| | | |
|---|---|---|
| 6,385,647 B1 | 5/2002 | Willis et al. |
| 6,473,441 B1 | 10/2002 | Dygert |
| 6,611,531 B1 | 8/2003 | Chen et al. |
| 6,678,740 B1 | 1/2004 | Rakib et al. |
| 7,050,440 B2 | 5/2006 | Colmant et al. |
| 7,680,943 B2 | 3/2010 | Conta et al. |
| 2001/0004768 A1 | 6/2001 | Hodge et al. |
| 2001/0005908 A1 | 6/2001 | Hodge et al. |
| 2002/0007494 A1 | 1/2002 | Hodge |
| 2002/0015409 A1 | 2/2002 | Gao et al. |
| 2002/0019984 A1 | 2/2002 | Rakib |
| 2002/0048258 A1 | 4/2002 | Oyama |
| 2002/0059637 A1 | 5/2002 | Rakib |
| 2002/0087976 A1 | 7/2002 | Kaplan et al. |
| 2002/0091003 A1 | 7/2002 | Beken |
| 2002/0095681 A1 | 7/2002 | Lin et al. |
| 2002/0143996 A1 | 10/2002 | Odryna et al. |
| 2002/0147982 A1 | 10/2002 | Naidoo et al. |
| 2002/0161918 A1 | 10/2002 | Asano et al. |
| 2002/0178274 A1 | 11/2002 | Kovacevic |
| 2003/0050989 A1 | 3/2003 | Marinescu et al. |
| 2003/0058885 A1 | 3/2003 | Sorenson et al. |
| 2003/0061621 A1 | 3/2003 | Petty et al. |
| 2003/0081131 A1 | 5/2003 | Farnan et al. |
| 2003/0093563 A1 | 5/2003 | Young et al. |
| 2003/0126294 A1 | 7/2003 | Thorsteinson et al. |
| 2003/0133456 A1 | 7/2003 | Beck |
| 2003/0163826 A1 | 8/2003 | Weinstein |
| 2003/0169314 A1 | 9/2003 | McAlonis |
| 2004/0172658 A1 | 9/2004 | Rakib et al. |

FOREIGN PATENT DOCUMENTS

| | | |
|---|---|---|
| TW | 513635 | 12/2002 |
| WO | 99-65196 | 12/1999 |
| WO | 03/063425 | 7/2003 |

OTHER PUBLICATIONS

Taiwanese Patent Office Search Report for application No. 095102844, search completed May 26, 2008, pp. 1-6.

International search report and written opinion for application No. PCT/US2006/000126, mailed Sep. 19, 2006.

Japanese Office Action for application No. 2006-18622, mailed Jul. 25, 2008, 5 pages.

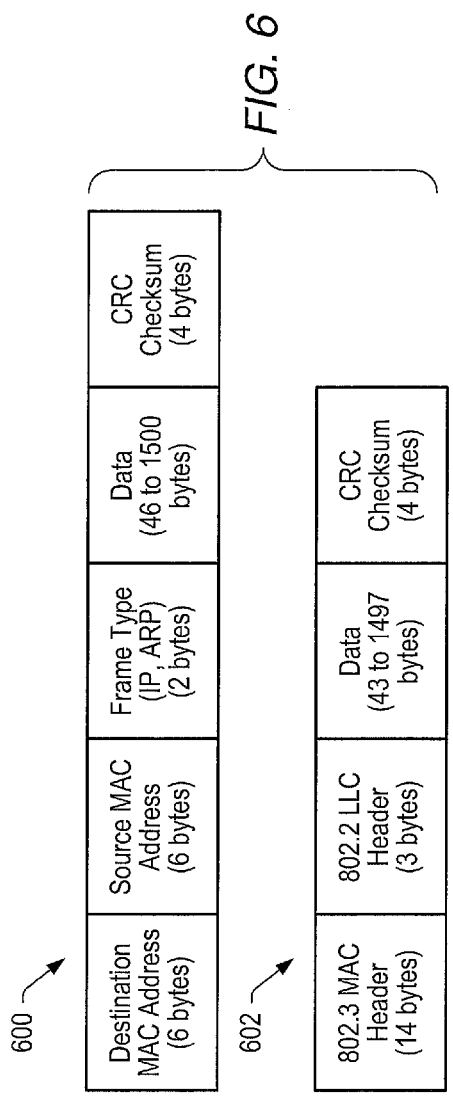

HIGH SPEED ETHERNET MAC AND PHY APPARATUS WITH A FILTER BASED ETHERNET PACKET ROUTER WITH PRIORITY QUEUING AND SINGLE OR MULTIPLE TRANSPORT STREAM INTERFACES

PRIORITY CLAIM

This application is a divisional of Ser. No. 11/046,292 titled "High Speed Ethernet MAC and PHY Apparatus with a Filter Based Ethernet Packet Router with Priority Queuing and Single or Multiple Transport Stream Interfaces" and filed Jan. 28, 2005, now U.S. Pat. No. 8,281,031 whose inventors are Neil Winchester, Paul Brant, William Chiechi, Charles Forni, and Anthony Tarascio and which is hereby incorporated by reference in its entirety as though fully and completely set forth herein.

BACKGROUND OF THE INVENTION

1. Field of the Invention

This invention relates generally to the field of digital interface design and, more particularly, to communications interface design.

2. Description of the Related Art

Within the past two decades personal computers (PC) have joined television sets, high fidelity stereo equipment, and compact disc players as part of the vast array of electronic devices widely used in both the office and the home. In recent years the electronics marketplace has also seen a proliferation of appliances and personal electronics devices that use solid-state memory, in addition to devices that employ other widely used storage mediums. Some of the more popular devices include video cameras, photo cameras, personal digital assistants, portable music devices, and consumer electronics systems such as set top boxes, high definition (HD) television systems and digital recorders among others. Corresponding to the proliferation of such devices has been an emphasis on connectivity and networking for transferring data between the personal electronic devices, personal computers, and/or set top boxes.

In addition to specifications for internal busses, such as the Peripheral Component Interconnect (PCI), various interface standards for connecting computers and external peripherals have also been introduced, each aiming to provide simple connectivity at high speeds. Examples of such standards include the IEEE 1394 standard also referred to as FireWire, and the Universal Serial Bus (USB), both high-speed serial bus protocols. The most widely used networking standard for connecting computers in both Local Area Networks (LANs) and Wide Area Networks (WANs) has been the Ethernet protocol. More specifically, Ethernet is the IEEE 802.3 series standard, originally based on the Carrier Sense Multiple Access with Collision Detection (CSMA/CD) method that provided a means for two or more computer stations to share a common cabling system. CSM/CD has formed the basis for Ethernet systems that reached transfer speeds in the megabit range, that is the Mbit/sec range. Recent switched based and/or router based Ethernet systems are capable of supporting transfer rates in the Gbit/sec range. Ethernet generally makes efficient use of shared resources, is typically easy to reconfigure and maintain, and provides compatibility across many manufacturers and systems, while keeping the cost low.

However, Audio/Video (A/V) consumer entertainment systems such as HD televisions, set-top box and personal video recorders (PVRs) are generally not optimized for distributing/receiving high quality high resolution programming content through a standards based Ethernet network. This typically holds for broadband Ethernet connections as well. One issue that has presented a problem in the development of entertainment systems has been the migration from a closed network to an open network while maintaining performance levels required in the distribution of higher quality/resolution A/V programming content. It has also become increasingly difficult, if at all possible, to obtain the desired performance levels while moving real-time streaming data over a limited bandwidth local bus, utilizing standard Ethernet controllers. In addition, the generally high prices of consumer electronic products featuring Ethernet network components have made it difficult to assemble systems at reasonable costs.

Certain complexities inherent in the transmission of real-time and non-real-time audio/video data do not present a problem when employing data transport models and/or approaches such as digital satellite, cable, and terrestrial and proprietary transmission systems. Digital satellite, cable and other proprietary transmission systems are typically "closed networks". Generally, a "closed network" in this context refers to a standard or non-standard (proprietary) solution not available to the general public. A proprietary solution will typically afford an individual manufacturer or group of manufacturers the time and resources to develop unique solutions that may achieve the desired performance goals, but such solutions will not usually interoperate with competing products. Examples of proprietary solutions typically include digital video broadcasting through Cable TV (CATV) Networks, digital video broadcasting over Public Switched Telephone Network (PSTN) and/or Integrated Services Digital Network (ISDN), and digital video broadcasting through Satellite Master Antenna TV (SMATV) distribution system networks. A variety of network standards have been defined for various physical and transport models, and implemented under standards bodies, such as the DVB—ETSI (European Telecommunications Standards Institute), for example. The overall content distribution system is typically controlled by broadband network providers such as Cable Vision, Comcast and Direct TV. A broadband network provider typically dictates the hardware, software and protocols used in such a system.

The diagram in FIG. 1 illustrates an example of a closed network implementing an interactive pay-per-view system reference model. The broadcast channel 102 is usually a unidirectional broadband network that distributes video, audio and possibly data to customer sites 104. The Interaction channel 106 is typically a bi-directional channel established between the user 104 and service provider 108 for interaction purposes. Interaction channel 106 generally comprises a narrowband channel, commonly known as a return channel, which may be used to make requests to the service provider or to answer questions. The broadcast head-end 110 and Interactive head-end 112 bridge the video and audio broadcast channels 102 to the Broadcast and interactive Service provider 108, usually over a proprietary network. On the Customer premise 104 side, connections are typically made to a display device 120 (for example a TV set) through coaxial cabling from a set-top-box 122. The diagram in FIG. 1 shows multiple set-top-boxes within one home. Signals entering the home through a single coaxial cable may be distributed using splitters and possibly repeaters. It is important to note that closed systems or networks have stringent resource provisioning since the end-to-end connection is typically controlled and maintained by a single service provider.

In contrast, in an "open" network the hardware, software and the corresponding protocols are all defined by well-known standards with solutions readily available from different manufacturers, where such solutions are generally interoperable with each other. Additionally, an open network is a shared network, with potentially numerous service and content providers using the shared network to distribute content. An example of an open network is the Internet as defined by the Internet Engineering Task Force (IETF). The IETF is a large, open community of network designers, operators, vendors, and researchers whose purpose is to coordinate the operation, management and evolution of the Internet, and to resolve short-range and mid-range protocol and architectural issues. Open network protocols are layered, based on the International Standards Organization (ISO) networking model. Any given open network generally has additional overhead depending on the network protocols used while communicating through the open network. Many, if not all current solutions do not have the system resources to support an open network model while processing higher quality and resolution A/V programming content. In addition, resource provisioning is typically more difficult to manage on such open networks.

Historically, broadband A/V distribution has been performed by satellite and cable services utilizing set-top-box (STB) and PVR devices. An example of such a system is shown in FIG. 2. The diagram in FIG. 3 describes the broadband distribution flow—as relating to the system architecture shown in FIG. 2—of an A/V channel from satellite, cable or terrestrial reception to a rendering device, which may be a High Definition TV (HDTV) set or video projector. For example, referring to the components in FIG. 2 and the flow illustrated in FIG. 3, a satellite dish may receive various broadcast channels as satellite signals (301). The receiver (Front End Device) may be a zero IF tuner 202 implementing quadrature phase shift keying (QPSK) or phase shift keying (PSK) demodulation along with forward error correction (FEC) (302). The broadcast video, typically represented in the form of a serial or parallel digital output conforming to a standard interface such as digital video broadcast server (DVBS) or DirecTV specification, may be transferred through the Transport Stream Interface (TSI) 204, (304). TSI 204 typically comprises a dedicated bus configured for transferring digital audio and/or video data packets, oftentimes in real-time. In another set of applications, TSI 204 may be a dedicated bus configured for transferring real-time application data in general.

Details of a standard TSI are documented in the CENELEC (European Committee for Electro-Technical Standardization) Standards body specification EN 50083-9. More specifically, reference information pertaining to the aforementioned standard TSI is contained in 'EN 50083-9:1998 "Cable networks for television signals, sound signals and interactive services—Part 9: Interfaces for CATV/SMATV head ends and similar professional equipment for DVB/MPEG-2 transport streams"', as well as in 'EN 50083-9:2002 "Cable networks for television signals, sound signals and interactive services—Part 9: Interfaces for CATV/SMATV head ends and similar professional equipment for DVB/MPEG-2 transport streams"'. The specification may be obtained from the following webpage: http://www.cenelec.org/Cenelec/Homepage.htm.

Referring again to FIG. 3 in relation to FIG. 2, the data may then be parsed (306), descrambled (308) and further de-multiplexed (310) depending on the conditional access methods and compression standards that have been implemented. The Data may then be stored (312) for use on another system or for playback at a later time, or may be decoded (314) and played back on a rendering device (316). It should be noted that many of the steps outlined in FIG. 3 are typically implemented in both hardware and software. Decoding (314) and de-multiplexing (310) are examples of functions that can be performed by hardware and software. Constantly changing standards and methods oftentimes necessitate the implementation of certain functions in software. Implementing these algorithms in software will generally afford the highest degree of flexibility while minimizing obsolescence.

The above-described distribution model generally works well for satellite, cable or terrestrial broadcasting. However, distribution of A/V content using Ethernet as the primary method of distribution produces additional challenges. As shown in FIG. 2, an Ethernet controller 210 is typically coupled to a local (or memory) bus 212 of the STB/PVR system on a chip (SOC) 208. This network connection has been traditionally used for Internet access through cable modems or digital subscriber line (DSL) broadband connections. Using standard Ethernet controllers on a local bus will generally not deliver the performance required for real time A/V distribution. Because the Ethernet controller 210 generally shares the local bus 212 with other peripherals, processing of network data may be considerably slowed down and/or delayed. Processing additional network protocols, such as TCP/IP and others, may further slow down the system.

Existing A/V solutions generally use Ethernet connectivity at typical data rates of 1 to 6 Mbits per second for activities such as Internet web surfing, and as a return path for video-on-demand (VOD) applications, billing systems, and limited A/V distribution in the home. Bandwidth requirements for streaming higher quality video and/or audio content are substantially higher. For example, to support one High Definition (HD) video stream, a throughput of 12 to 60 Mbits per second with possibly some form of priority bandwidth provisioning, including QOS (Quality of Service), may be required. The need for QOS is usually determined by buffering and latency. For example, increased bandwidth requirements may necessitate an increased QOS in case a time delay between switching video content channels exceeds the average acceptable time elapsed between channel selections made by a user while "channel surfing", due to buffering delays. Distribution of A/V data must preferably remain steady with minimal delays. With existing Ethernet solutions, similar to Ethernet controller 210 in FIG. 2, achieving the required performance levels is typically very difficult if at all possible.

In addition, STB and other consumer electronics devices are generally very cost sensitive. Most embedded processors and hardware building blocks comprised in the bulk of consumer electronics devices are usually low cost and feature limited performance (typically referenced as millions of instructions per second (MIPS)). Trade-offs between memory access speeds, CPU speed, and power consumption are quite common. For most system designers, migrating to an open network with its additional network processing overhead, when the CPU bandwidth is just enough for the core application, might necessitate migrating to a more expensive system solution. In addition, with this additional network overhead, utilizing a standard Ethernet controller will typically not give the performance needed to enable an open network solution, especially when aiming for low cost consumer electronics products.

The concept of transferring real-time and non real-time video and audio content over a shared and open network has been addressed in a variety of ways. For example, wireless modulation solutions such as 801.11a, b and g have been considered for shared access local area networks. Wired solutions such as 802.3 10/100/1000 Base-T twisted wire pair encoding solutions have also been considered. Numerous solutions have also been described at the media access and transport level. Some of these solutions include methods of media access using Ethernet 802.3, Wireless, 802.11a,b and g and other solutions such as Asynchronous Transfer Mode (ATM), Synchronous Optical Networking (SONET), and others. Additionally, various methods to achieve a higher QOS have been addressed by certain proprietary solutions.

One approach involves the concept of "transmission profiles", where network systems and aggregators select paths by detecting additional information in the network packet, as in an Ethernet packet. In other cases Virtual Local Area Network (VLAN) tags are utilized, or ATM is implemented utilizing (virtual) path identifiers. Some solutions implement data bandwidth allocation, where network systems may be architected such that high-speed access is provided over frequency-division multiplexed (FDM) channels, enabling transmission of Ethernet frames and/or other data across a cable transmission network or other form of FDM transport. Devices would typically allocate downstream and upstream bandwidth on previously defined frequency channels based on time slot assignments for various network packets. In terms of transport, many current solutions utilize the Internet Protocol (IP). In some cases, various connection-oriented protocols such as Transmission Control Protocol (TCP) are employed.

One example of a productized solution is the TF-530 "Digital Streaming Controller" by Taifatech Inc. The TF-530 is a bridging engine, bundled with a TCP/IP protocol and featuring an integrated RISC CPU with various software components, including TCP/IP protocol stack and HTTP server applications. The software also includes IP, User Datagram Protocol (UDP), TCP, Internet Control Message Protocol (ICMP) and Real-time Transport Protocol (RTP) accelerator support. The TF-530 also features a dedicated streaming video interface.

However, most existing systems typically do not offer an open network solution built around the Ethernet protocol that is capable of maintaining performance levels required in the distribution of higher quality and resolution A/V programming content. Current systems utilizing standard Ethernet controllers generally do not allow for movement of real time streaming data over a limited bandwidth local bus, thus failing to achieve desired performance levels.

Other corresponding issues related to the prior art will become apparent to one skilled in the art after comparing such prior art with the present invention as described herein.

SUMMARY OF THE INVENTION

In one set of embodiments, an audio-visual content delivery system, such as a set-top box/personal video recorder system, is configured to interface with a local area network (LAN). A packet processing circuit comprised in the system may be configured to intercept, filter, and route data packets, which may be Ethernet packets, incoming from the LAN, to specific ports and/or queues without host processor intervention. The packet processing circuit may utilize a set of filter and routing mechanisms to interpret various protocols, for example Internet Engineering Task Force (IETF) networking protocols, and may transfer the packet data in a format recognized by a variety of consumer subsystems, each of which may be coupled to the packet processing circuit. The packet processing circuit may be implemented as a semiconductor device, and may allow encapsulated application data, (encapsulated using standardized encapsulation techniques), to be routed to a plurality of different types of application sinks or processors, forming a point-to-point or multi-point serial or parallel data stream over a standard transport covering numerous levels of the ISO data communications stack.

In one embodiment, the packet processing circuit is configured to setup and create a network connection with the assistance of an external processor (or equivalent system level controller), and route application data to a specific hardware interface through the network connection. The packet processing circuit may thus operate as a hardware interface that is separate and distinct from a normal data interface that is typically established between a network data communications controller and host processor, where the normal data interfaces may comprise various parallel bus Architectures such as PCI (Intel's Peripheral Component Interface), SRAM-like, SDRAM interface, and other similar types of interfaces. Therefore, in one set of embodiments the packet processing circuit may be operated as a single-port Ethernet filter and router configured with the capability of incorporating additional hardware acceleration properties.

In one embodiment, the packet processing circuit features a unique data stream interface with the ability to filter packets using existing, published, well-defined and non-proprietary encapsulation methods implemented in hardware. Through hardware-assisted filtering, performance levels not typically achieved in software may be reached, providing a highly efficient and cost effective solution to the network transport encapsulation and filtering requirements of applications such as real-time video and audio streaming. Performance and flexibility of transferring data from a LAN—an Ethernet Network in certain embodiments—to a data streaming "consuming" subsystem may increase through the efficient performance of filtering tasks in hardware. Advantages and benefits of performing hardware-assisted filtering according to principles of the present invention include the creation of an open system network preprocessing function, the ability to offload host CPU processing, the creation of a dedicated streaming pipe interface, and the ability to address specific needs for video and audio content distribution.

Preferred embodiments may feature specialized hardware with the ability to focus on high bandwidth applications capable of preprocessing network video and audio content. The specialized hardware may reduce the main CPU requirement of dealing with the complexities of networking, making high-resolution video and audio streaming possible.

Thus various embodiments of the invention may provide a system and method for establishing network connectivity and achieving high performance real-time content delivery utilizing a hardware-accelerated approach.

BRIEF DESCRIPTION OF THE DRAWINGS

The foregoing, as well as other objects, features, and advantages of this invention may be more completely understood by reference to the following detailed description when read together with the accompanying drawings in which:

FIG. 6 illustrates the format of an Ethernet II frame and the format of an 802.3 frame according to one embodiment;

FIG. 7 shows the structure of a network layer protocol IP header according to one embodiment;

Figure 1:
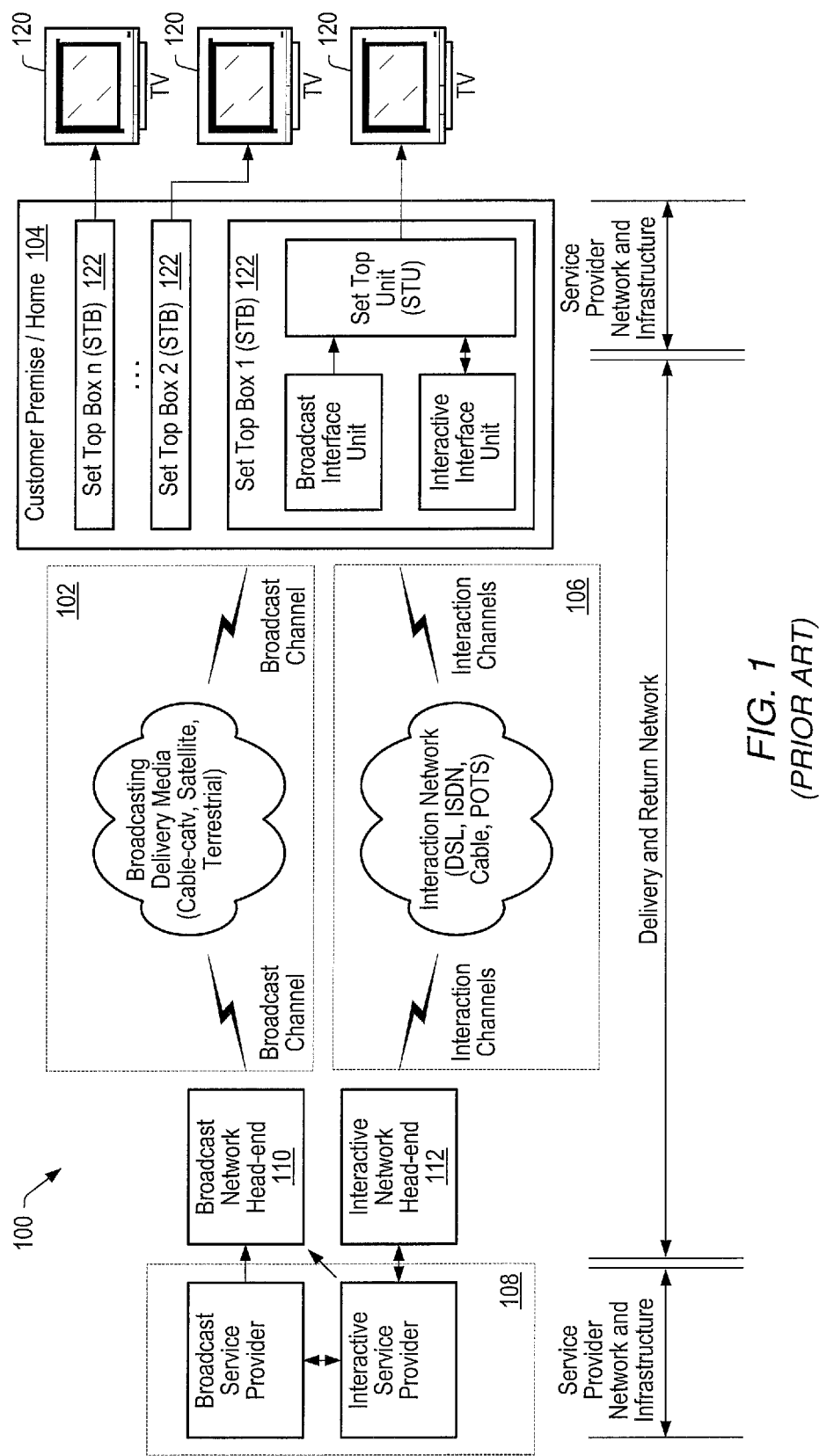
FIG. 1 illustrates a closed network model for audio-visual content delivery, according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, 'DWORD', or "Double Word" is used to reference a 32-bit size data word. "Local system memory" or "local memory" refers to a memory comprised in a host system and typically embedded in or directly interfacing with a central processing unit and/or central controller. "Remote system memory" or "remote memory" refers to a memory comprised in the host system but not embedded in or directly interfacing with the central processing unit and/or central controller, or a memory comprised in a remote system distinct from the host system. When comprised in the host system, a remote memory may represent memory embedded in a peripheral device and/or additional memory not directly interfacing to the host system's dedicated memory bus.

As also used herein, and as applied to a system, "real-time", "real-time delivery", "real-time operation" and/or "real-time streaming" indicates that an input signal (or set of input signals) to the system and/or any corresponding output signal (or output signals) can be processed (or generated) continuously by the system in the time it takes the system to input and/or output the same set of signals, independent of the processing delay incurred in the system. In other words, the input signals and corresponding output signals are being processed and outputted, respectively, by the system at a rate commensurate, on average, with the rate at which the input signals are being received by the system. When the word "port" is used, it is meant to refer to an endpoint to a logical connection in a network system, for example in TCP/IP and UDP networks. In one set of embodiments, a "port number" may be used to identify what type of port is being referenced. For example, in TCP/IP and/or UDP networks, port number 80 is used for HTTP traffic. In another set of embodiments, a "port" may also represent a combination of encapsulation header field values from which a single interface match may be obtained.

Also, as used herein, "transport stream interface" (TSI) is used in a general sense to reference a dedicated interface configured for the transmission of data packet streams that have been derived from elementary streams, service information, private data, and conditional access control among others. The data packet streams, which may include video and audio streams, may also be multiplexed together and converted into "transport packets" for transmission over the "transport stream interface". As previously mentioned, one example of a TSI is described on the following webpage: http://www.cenelec.org/Cenelec/Homepage.htm.

Figure 2:
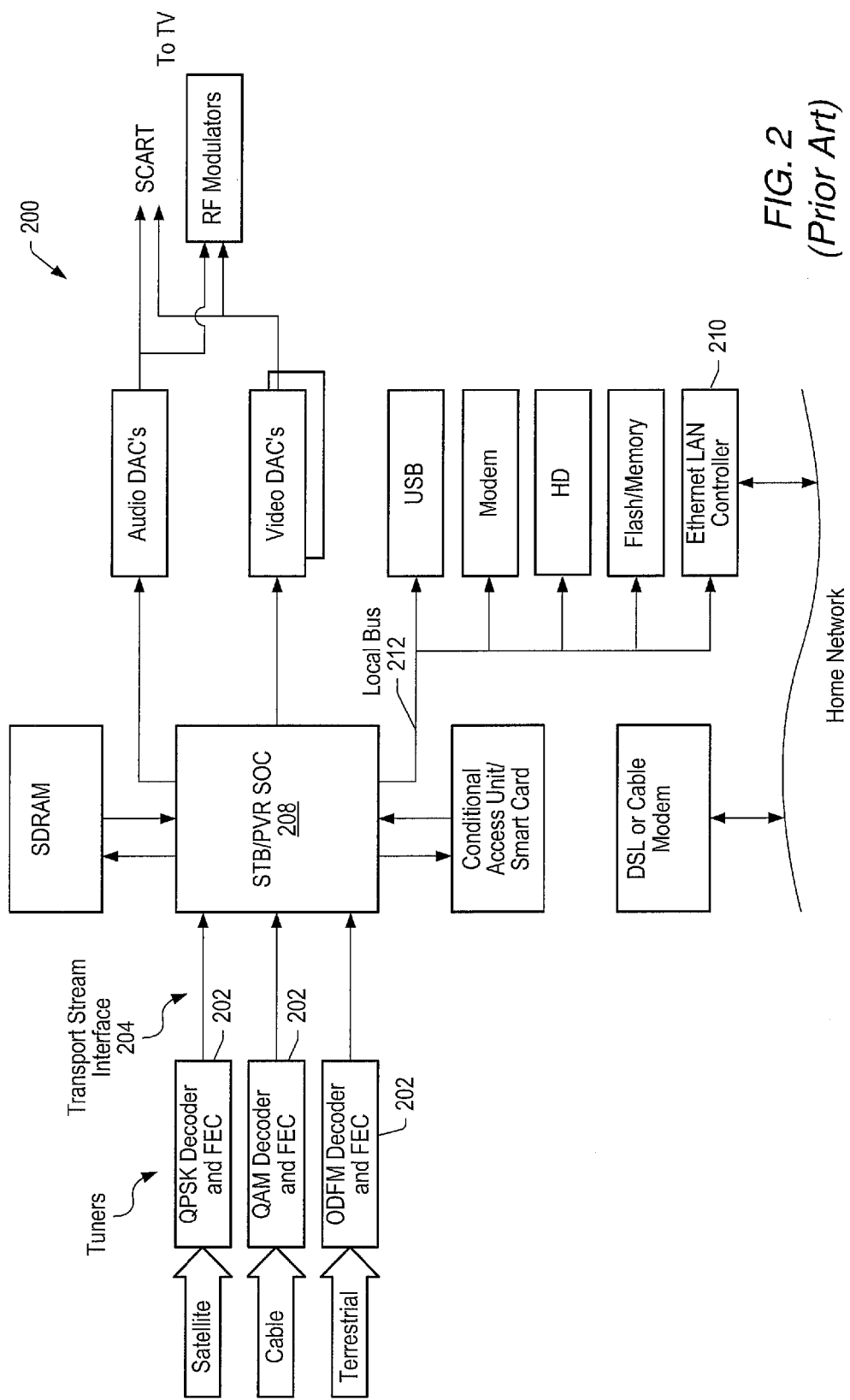
FIG. 2 illustrates a typical set-top box/personal video recorder system architecture, according to prior art.
Figure 3:
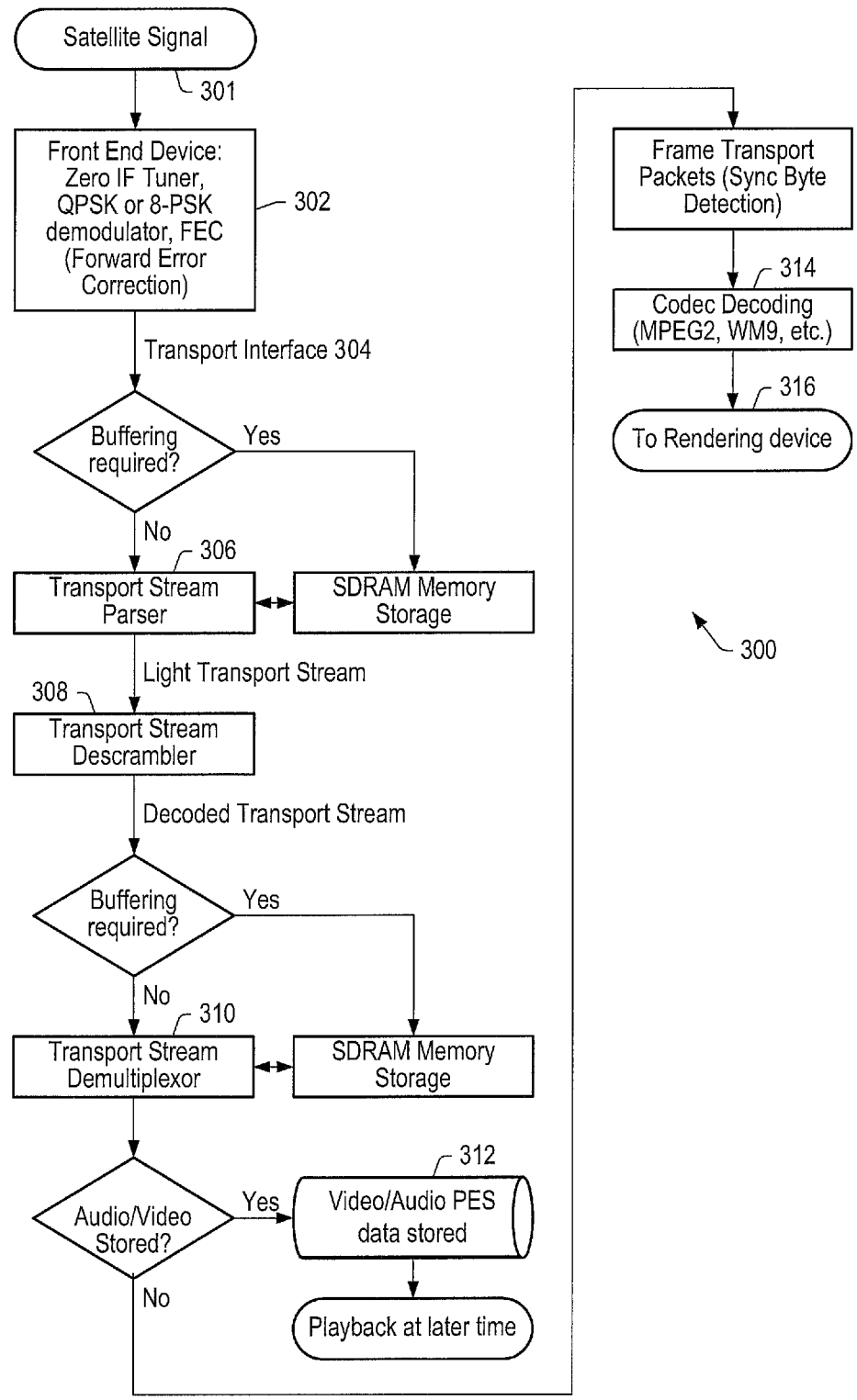
FIG. 3 shows a flow chart illustrating a typical transport stream flow for a set-top box/personal video recorder system, according to prior art.

As previously discussed, the system shown in FIG. 2 represents an STB solution featuring a network (in this case Ethernet) connection that is not optimized. In order for video or audio data to be transferred to the final rendering device (for example a TV in FIG. 2), the data would typically need to be transferred over the CPU's (STB/PVR SOC 208 in FIG. 2) local bus, Memory bus or I/O bus (local bus 212 in FIG. 2). With other devices potentially on the same bus, there will most likely be contention for bandwidth. For the system in FIG. 2 the STB/PVR SOC 208 would also be required to perform additional formatting and copying of the video and audio data. This additional formatting would ordinarily not be required if the video and audio data was transmitted to over the transport stream interface (204 in FIG. 2) normally used in A/V content delivery via a satellite or cable connection. In order to relieve the CPU from having to perform such formatting operations, a packet processing circuit may be configured to parse the incoming network packets in a manner analogous to that of a satellite or cable demodulator filtering incoming data. The diagram shown in FIG. 4 describes one embodiment of an STB system 400 that features such a packet processing circuit.

Figure 4:
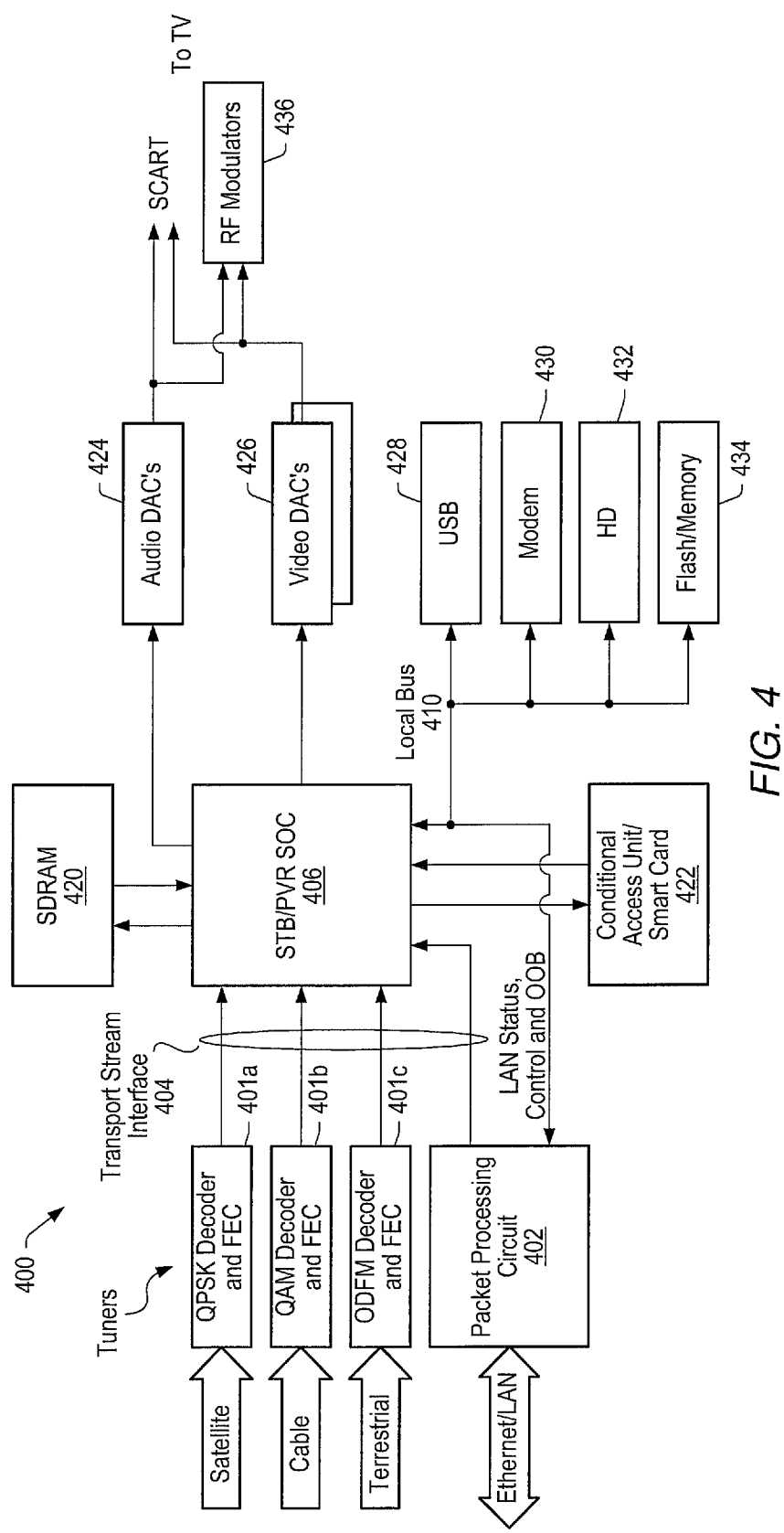
FIG. 4 illustrates one embodiment of a set-top box/personal video recorder system incorporating a packet processing circuit.

Referring now to FIG. 4, a Transport Stream Interface (TSI) 404 may couple tuners 401*a*, 401*b*, and 401*c* directly to the STB/PVR System On a Chip (SOC) 406. TSI 404 may also couple packet processing circuit 402 to STB/PVR SOC 406. TSI 404 may be a dedicated bus configured specifically for transferring real-time application data. While FIG. 4 illustrates an embodiment with one TSI, other embodiments may be configured with more than one TSI. Packet processor 402 may also be coupled to STB/PVR SOC 406 via a local bus 410 representing a memory bus or I/O bus interface/connection, for example. Local bus 410 may be an out-of-band (OOB) connection used for non-video and non-audio data that is aggregated into network data flow. Embodiments of local bus 410 may include, but not be limited to various CPU bus interfaces, PCI, AHB, DDR, SDRAM, and other like busses well known in the art. In one embodiment, packet processing circuit 402 is an Ethernet/IP decoder that implements some functionality normally associated with code running on an embedded processor that may be configured in STB/PVR SOC 406. One example of such functionality includes functions performed in relation to the network stack included in the TCP/IP suite of protocols.

Figure 5:
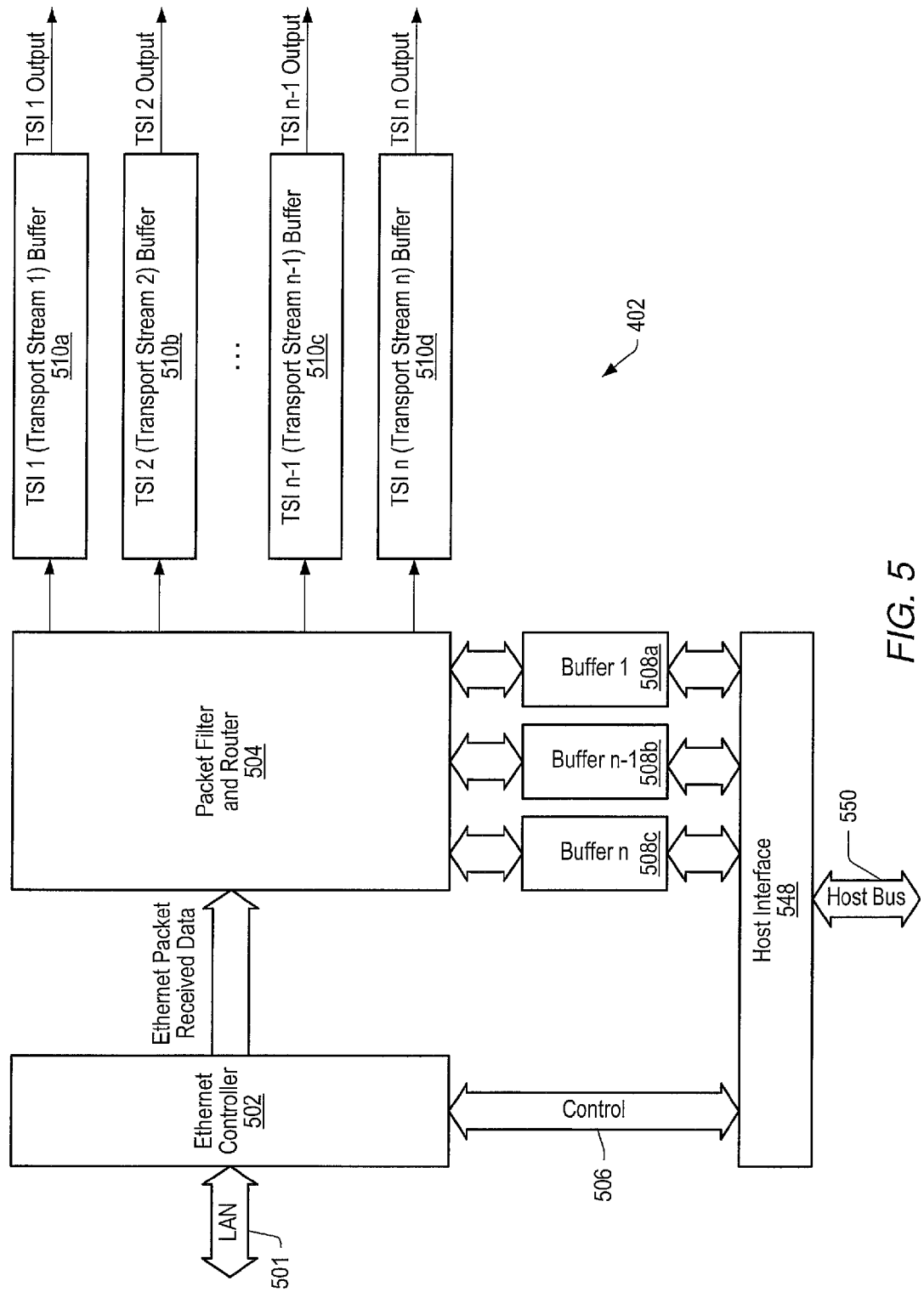
FIG. 5 illustrates one embodiment of the packet processing circuit of FIG. 4.

One embodiment of packet processing circuit 402 is shown in FIG. 5, and includes an Ethernet controller 502, (which may include a 10/100/1000 and 10 Gig physical layer (PHY) and media access controller (MAC)), coupled to a packet filter and router (PFR) 504 for data streaming applications. PFR 504 may interface with 'n' number of receive buffers as represented by receive buffers 508a-508c, which may interface with a host bus 550 via host interface 548. Ethernet controller 502 may also interface with host bus 550 via host interface 548 through control signal bus 506. In certain embodiments host bus 550 coincides with local bus 410 of FIG. 4. In certain embodiments, host bus 550 (and/or local bus 410) may support Master and/or Slave DMA. The outputs from packet processing circuit 402 may be provided by 'n' number of TSI buffers represented by TSI buffers 510a-510d, which may be FIFOs. In alternate embodiments, (not shown), outputs from packet processing circuit 402 may be directly provided by PFR 504 to TSI 404 without using TSI buffers 510a-510d. In one set of embodiments, TSI buffers 510a-510d may be physically or logically located outside of, and remote to packet processing circuit 402, coupling to packet processing circuit 402, more specifically to PFR 504, using a standard memory bus architecture such as DDR, DDR2, SDRAM, SRAM or FLASH RAM. In one embodiment, packet processing circuit 402 is configured to support advanced consumer electronics applications, particularly those applications that require the transmission of low jitter, time critical (isochronous) information. Examples of such information include but are not limited to streaming video and audio applications that require transfer of data at a constant bit rate. In other embodiments, which are not shown but are possible and are contemplated, packet processing circuit 402 may be configured to support other selected applications that use real-time data.

Figure 11:
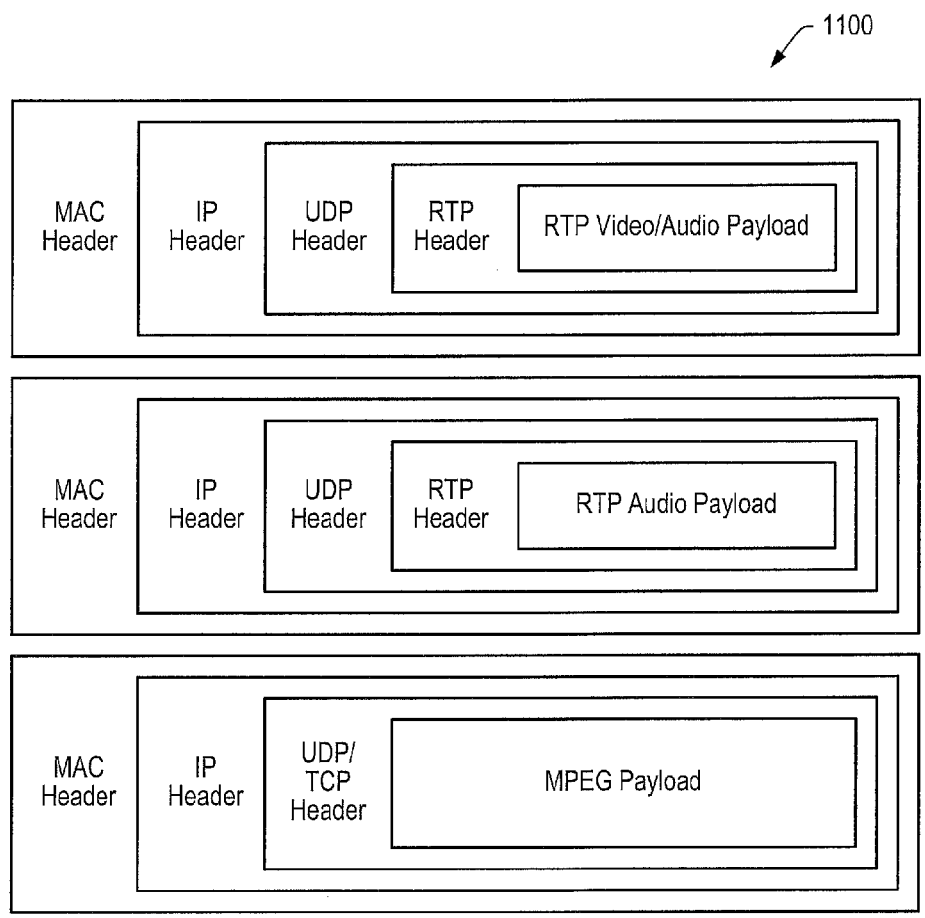
FIG. 11 shows encapsulation examples of video and audio payload according to one embodiment.

In one embodiment, packet processing circuit 402 is configured to simultaneously filter and route multiple data type streams, thereby transferring specific Ethernet packets to various host interfaces, such as host interface 548. Possible host interfaces include standard bus architectures such as PCI, Local Bus or Memory buses, and non-standard busses utilizing variable data bus widths and control definitions. Packet processor 402 may operate to redirect application data streams to a reception device, for example a video decoder, for data consumption. FIG. 11 illustrates examples of how video and audio data may be encapsulated into packets for transfer over a network, in this case an Ethernet network, from a content provider to a rendering device. More specifically, encapsulation examples are shown for RTP video/audio content, RTP audio content, and MPEG content. In one set of embodiments, PPC 402 may be configured to manage an RTP connection through various configuration/control registers and in conjunction with SOC 406, allowing for reduced jitter and reduced buffering requirements in real-time applications.

Figure 12A:
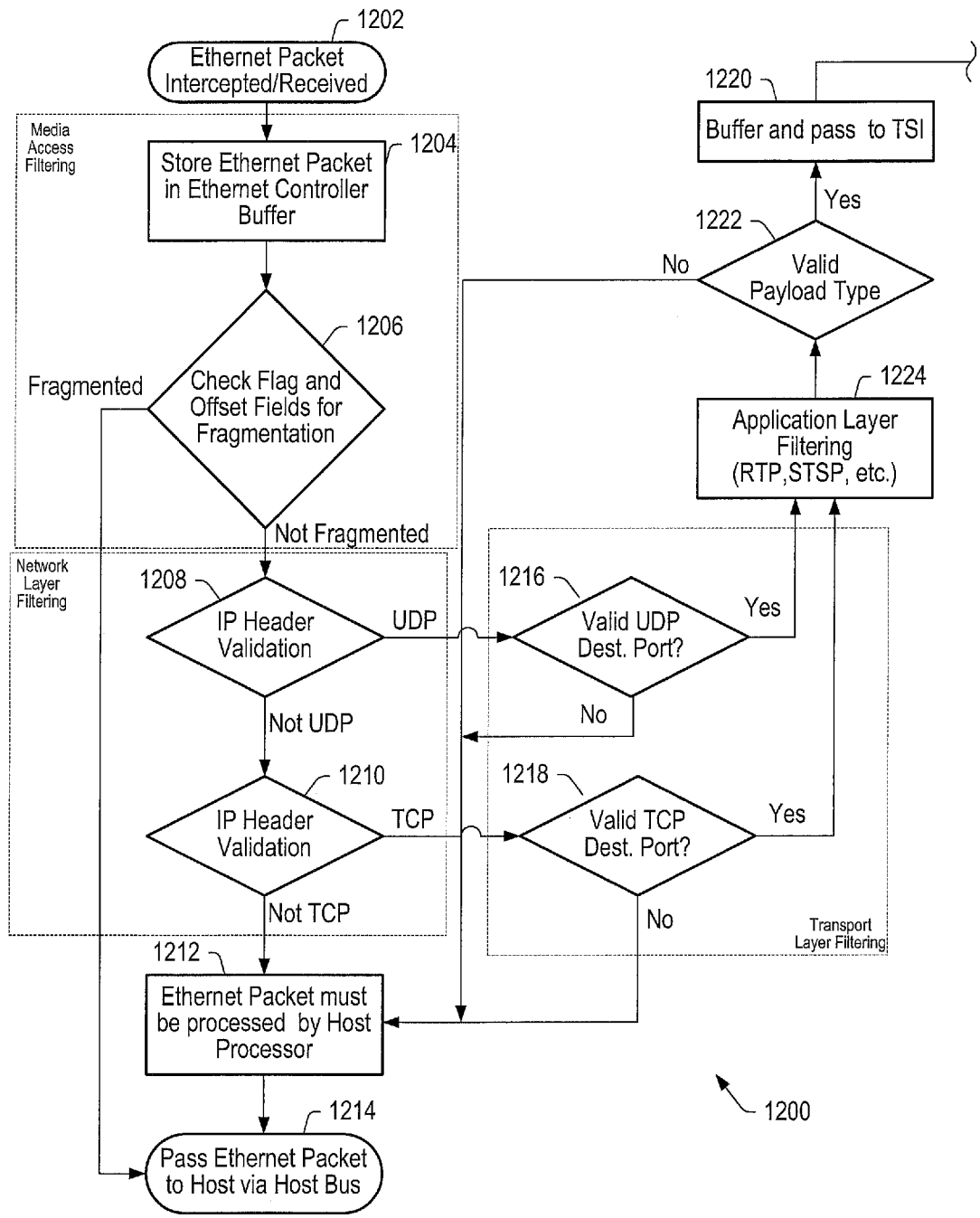
FIG. 12A-B shows an example of logical data stream filtering, and routing of application data according to one embodiment.
Figure 12B:
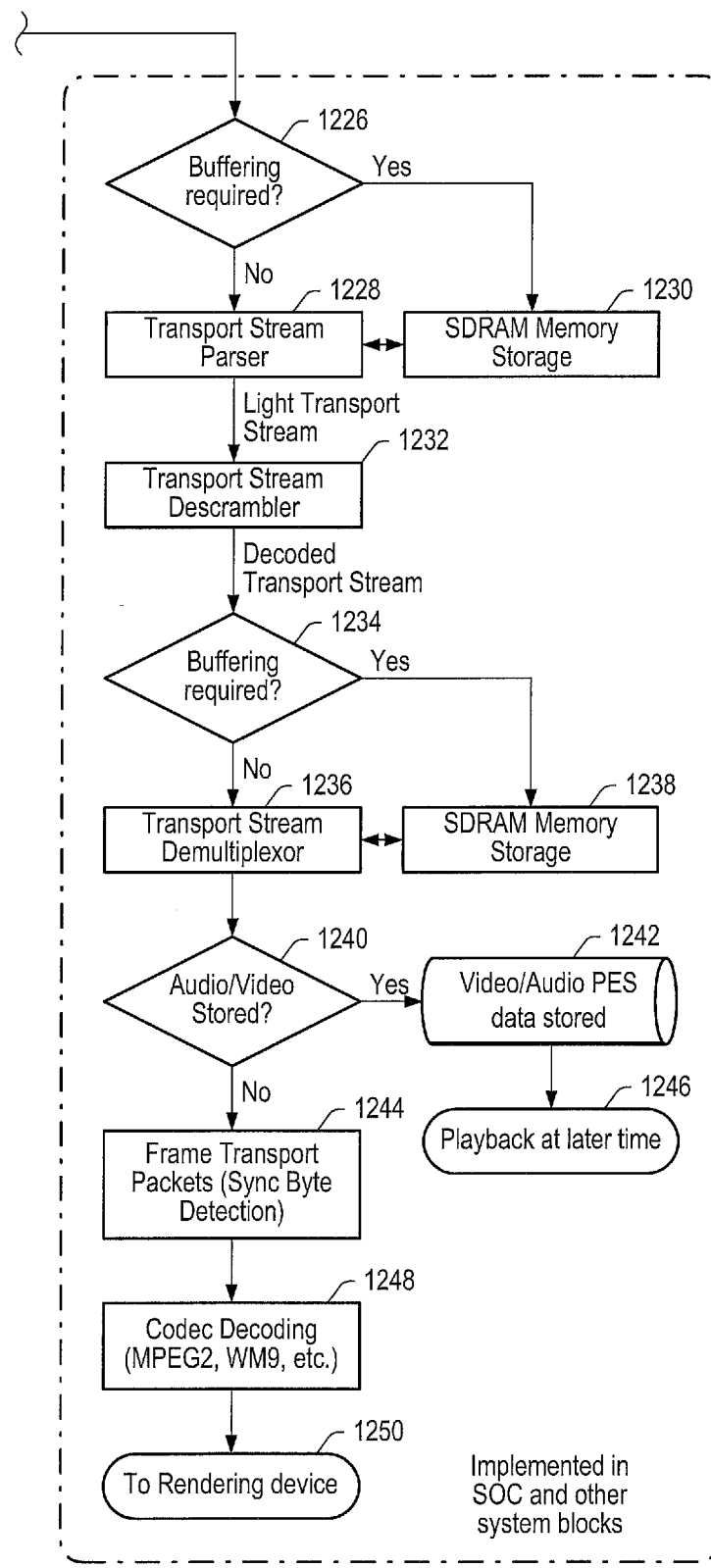

A flow of logical data stream filtering, and application data routing performed by packet processing circuit 402 according to one embodiment is shown in FIG. 12A-B. The flow of FIG. 12A-B is established with the premise that the video or audio server has already established a connection with the receiver, that the connection is established through the host bus interface (548 in FIG. 4), that the connection is established without any special MAC or transport functionality, and that packet processing circuit 402 comprises a standard network Ethernet controller (502 in FIG. 4). However, the flow of FIG. 12A-B may be adapted to perform logical data stream filtering, and application data routing of data packets conforming to any chosen network standard that is not an Ethernet standard, according to premises associated with that chosen network standard.

As previously mentioned, for Ethernet connectivity packet processing circuit 402 may comprise a 10/100/1000 and 10 Gig Ethernet controller (502 in FIG. 5) designed for embedded applications where performance and flexibility are required. In one set of embodiments, Ethernet controller 502 is IEEE 802.3 10BASE-T and 802.3u 100BASE-TX compliant. As shown in FIG. 12A-B, a data packet, in this case an Ethernet packet, intended for a central controller (such as STB/PVR 406 in FIG. 4) may be intercepted (1202). The packet may be stored in the Ethernet MAC data buffers that may be comprised in Ethernet controller 502 (1204). The MAC comprised in Ethernet controller 502 may perform address filtering using Ethernet header information, such as shown in FIG. 6. As shown in FIG. 6, table 600 illustrates the format of an Ethernet II frame, and table 602 illustrates the format of an 802.3 frame. While the formats shown in FIG. 6 exemplify Ethernet and 802.3 packets, in certain embodiments packet processing circuit 402 may be configured to redirect/route packets of data embedded according to other media access formats, which are used in support of other applications, to a host or a system in a similar manner.

Figures 8, 9:
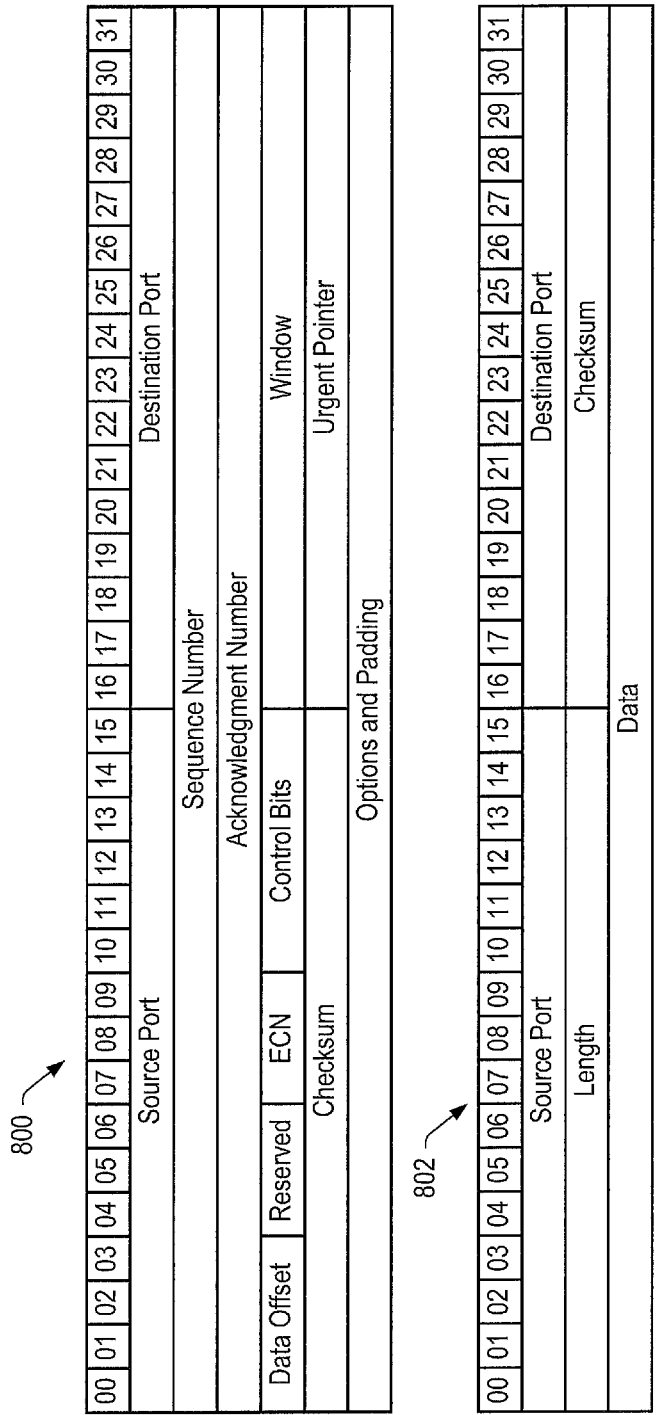
FIG. 8 shows the structure of a transport layer protocol TCP header and the structure of a transport layer protocol UDP header according to one embodiment.
FIG. 9 shows the structure of an application layer protocol RTP version 2 header according to one embodiment.

Referring again to FIG. 5, in a preferred embodiment the next block in the receive path is PFR 504. PFR 504 may utilize various network, transport and application layer header information to determine the proper routing to any of the receive buffers 508a-508c, or to any of the TSI buffers 510a-510d. Examples of the network, transport and application layer headers used in one implementation are shown in FIGS. 7, 8 and 9. More specifically, table 700 in FIG. 7 illustrates an example of a network layer protocol IP header, table 800 in FIG. 8 illustrates an example of a transport layer protocol TCP header, table 802 in FIG. 8 illustrates an example of a transport layer protocol UDP header, and table 900 in FIG. 9 illustrates an example of an application layer protocol RTP version 2 header.

Referring again to FIG. 5, PFR 504 may utilize receive buffers 508a-508c to store received Ethernet packets based on a particular port match and according to a specific priority scheme, in which priority scheme SOC 406 may operate to retrieve through Host Interface 548 a particular sequence of packets corresponding to the matched port in a sequence that is different from the sequence in which the particular packets may have been serially received by Controller 502. In other words, SOC may be operated to retrieve data packets stored in receive buffers 508a-508c in a different order relative to the sequence in which the data packets have been originally transmitted via LAN 501.

Referring to both FIG. 12A-B and table 700 in FIG. 7, the IP header fields "Fragment offset" and "Flags" may be parsed to determine if the data packet is fragmented (1206). Fragmentation may be interpreted as the Total Length of the logical IP data packet exceeding the MAC length or Ethernet packet length. In one embodiment, packet processing circuit 402 is configured to support fragmented IP data-grams. To enable such support, storage memory of a size commensurate with the length of the maximum IP frame (up to 65,535 Bytes in one set of embodiments) may be configured internally within packet processing circuit 402, or externally, interfacing with packet processing circuit 402 through a dedicated bus. In one set of embodiments, the values for the "Fragment offset" and "Flags" fields may be checked to determine whether external memory is required in case the internal memory cannot satisfy the buffer requirements.

Referring again to FIG. 12A-B and table 700 in FIG. 7, the "Header Checksum" field may be used to verify the data integrity of the data packet as part of IP header validation (1208 and 1210). While in some embodiments the checksum value is validated, in other embodiments the checksum value may not be validated even though it may be available. Other checksum and/or CRC fields may be made available, as part of the header information shown in table 700 of FIG. 7, and redundant checks may not be required. In one set of embodiments, as part of IP header validation (1208 and 1210), the Internet Header Length (IHL) field may be checked to verify the length of the associated header as well as to determine the offset of the subsequent headers for further processing. In addition, the "Destination IP address" may be checked to verify the routing of the packet.

Referring now to FIG. 12A-B and table 800 in FIG. 8, the transport layer TCP header "Destination Port" information may be used to determine if the data packet is targeting a TCP port (1218) and continue routing the data packet to one of the receive buffers (508a-508c in FIG. 5) in case of an invalid TCP port (1212), or to any of the transport stream buffers (510a-510d in FIG. 5) in case of a valid TCP port (1224). The "Checksum" field may also be evaluated to determine data integrity.

Referring to table 802 in FIG. 8, the Transport Layer UDP header "Destination Port" may be used to determine if the data packet is targeting a UDP port (1216) and continue routing the data packet to one of the receive buffers (508a-508c in FIG. 5) in case of an invalid UDP port (1212), or to any of the transport stream buffers (510a-510d in FIG. 5) in case of a valid UDP port (1224). The "Checksum" field and "Length" field may also be evaluated to determine data integrity.

Referring to table 900 in FIG. 9, the Application Layer RTP header "PT" (Payload Type) field may be used to determine the payload data type (1224), and ascertain if it is a valid payload data type for transfer to a TSI buffer (1222), and continue routing the payload data to one of the receive buffers (508a-508c in FIG. 5) (1212) or to any of the transport stream buffers (510a-510d in FIG. 5) (1220). The "Sequence Number" field may also be evaluated to determine out of order or duplication of packets. The "Time Stamp" field may also be evaluated in order for the Host System to facilitate real time data streaming through obtaining feedback on time critical information, including synchronization and jitter calculations. For example, multimedia content in conjunction with one of many real time streaming protocols, including but not limited to the Real Time Streaming Protocol (RTSP), may make use of the "Time Stamp" field information.

Figure 10:
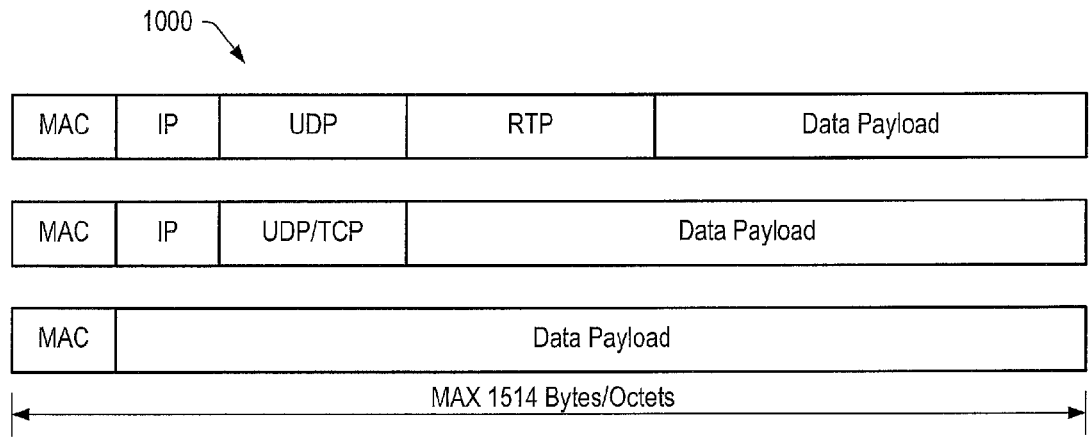
FIG. 10 shows examples of Ethernet packet headers according to one embodiment.

FIG. 10 and FIG. 11 illustrate the placement and ordering of the various headers within the Ethernet packet structure used in one set of embodiments. The packet structure shown may remain unchanged once the data or video stream is configured and started, however the various fields of the individual headers may change based on network traffic and routing options. As shown in FIG. 10 and FIG. 11, an Ethernet packet may consist of header(s) and a payload. The headers may vary depending on the application and network type. One or more headers may be required, and the order of the headers may typically be MAC, Network (IP in FIGS. 10 and 11), Transport (UDP and TCP), and application layer protocols (RTP in FIGS. 10 and 11), and other application headers.

Packet processor 402 may be configured to be flexible in how it routes the data to the appropriate external Host or TSIs. In one set of embodiments, TSI (404 in FIG. 4) comprises specific methods, signal definitions, protocols, bus arrangements, and timing, which together constitute a data flow. In preferred embodiments TSI 404 is configured to operate in a manner different from a typical host, device and/or memory interface. A typical or standard host interface may include PCI, VCI, PVCI, AHB, ASB, APB, Cardbus, Local Bus, and other CPU Host bus interfaces, which are defined as Shared System Interfaces (SSI). It may also include DDR, DDR2, SDRAM, SRAM, FLASH RAM, and Synchronous SRAM (SSRAM), which are defined as Memory Interfaces (MI).

Figure 13:
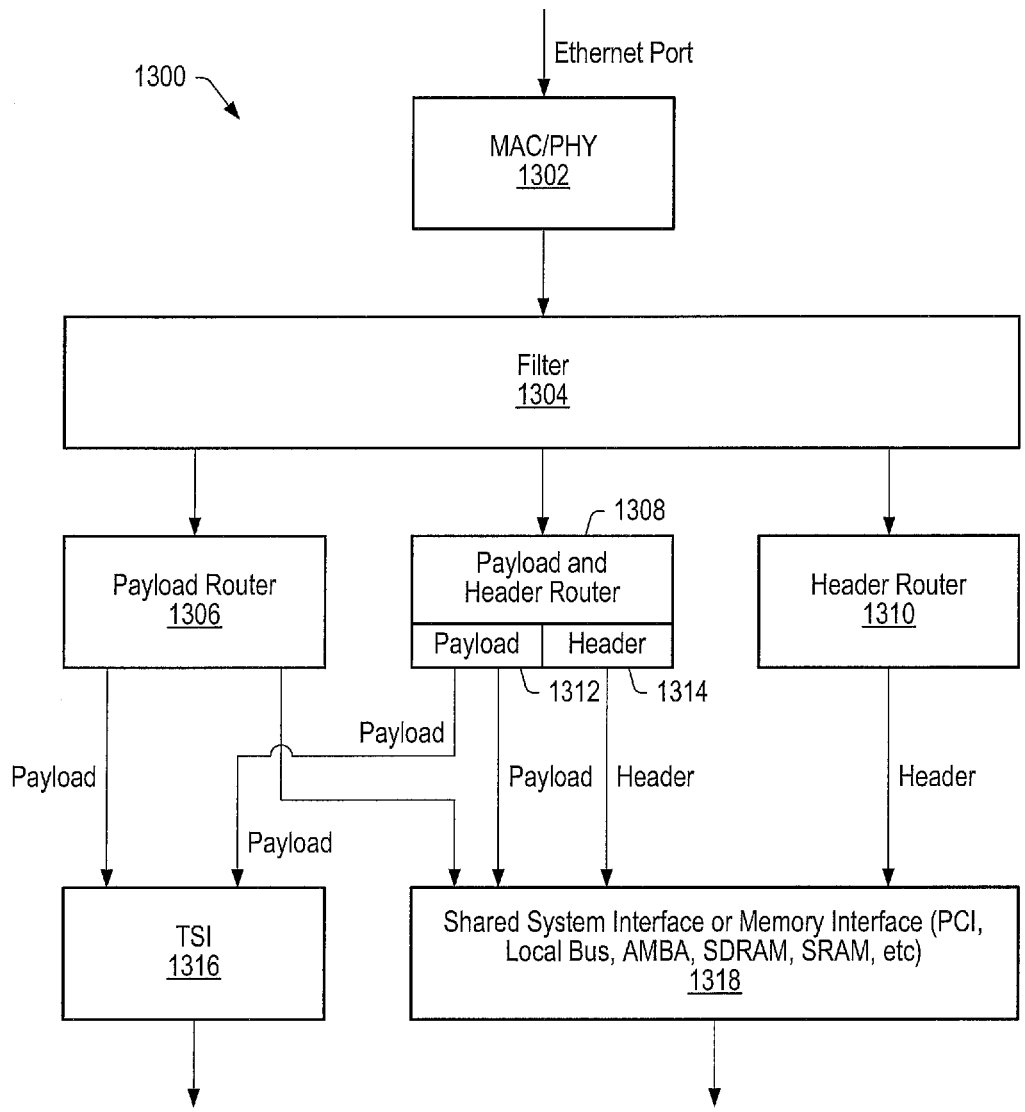
FIG. 13 shows the general data flow routing and filtering for the packet processing circuit of FIG. 4 according to one embodiment.

The diagram in FIG. 13 shows the general data flow, routing and filtering structure for packet processing circuit 402. In one embodiment, the structure comprises a filter block 1304 programmable to interpret the header fields as shown in tables 700, 800, 802, and 900 of FIGS. 7, 8, and 9, respectively. The structure may also comprise a payload router 1306, a payload and header router 1308, and a header router 1310. It should be noted that the routers are not limited to the headers defined in FIGS. 7, 8, and 9. Some embodiments may include other IETF header types, including other proprietary and non-standard encapsulation header types. In yet other embodiments, any and/or all of individual routers 1306, 1308, and 1310 may be configured to support a "cut-through" or "store-and-forward" architecture. Differences between the two architectures may affect the design parameters of buffer utilization, buffer size, jitter and system latency tolerance. For example, both architectures may be viable in case streaming content is transmitted at a constant bit rate, and if the content is—in the case of video—adaptive to the frame rate of the rendering device. Should such restrictions not be possible, buffer arrangements may be implemented according to a store-and-forward architecture.

Figure 14:
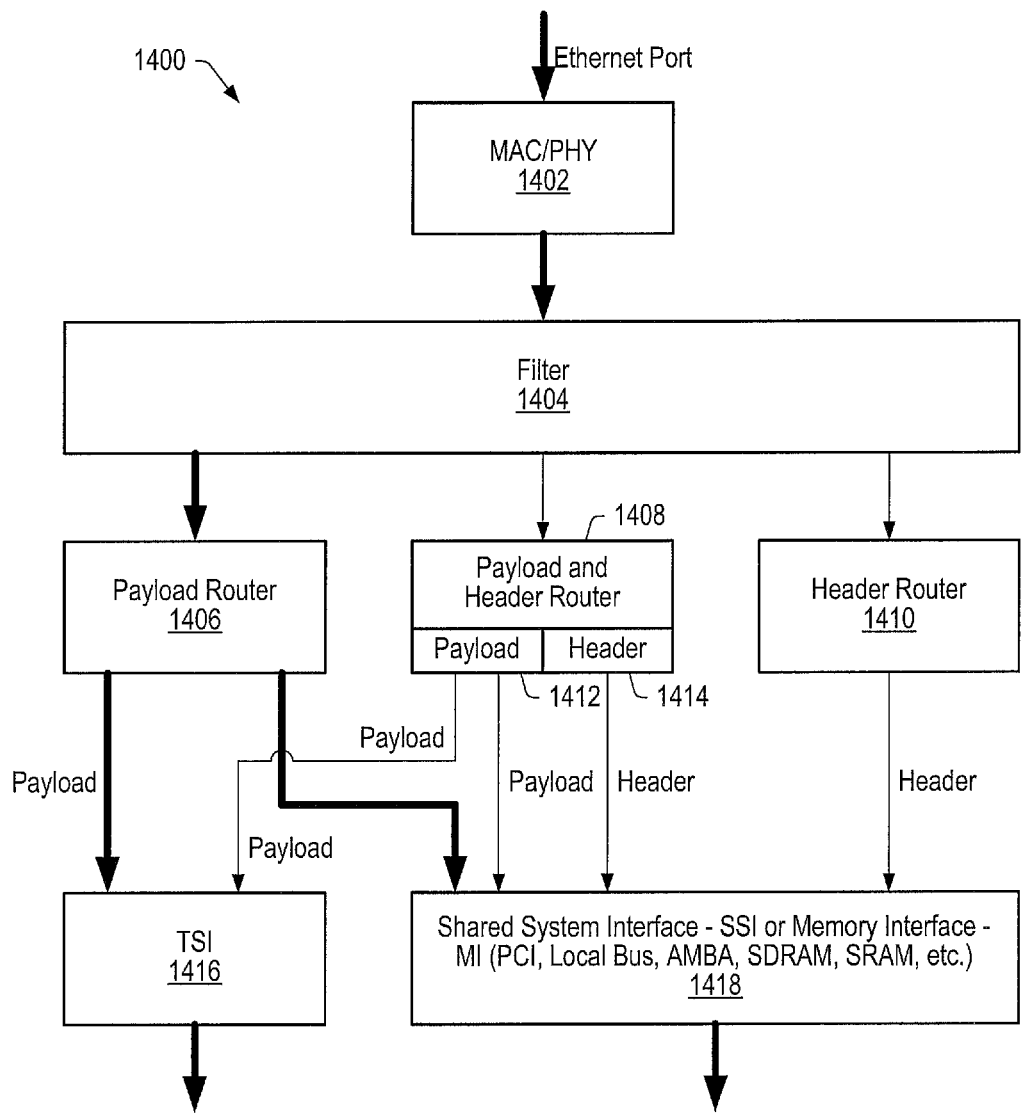
FIG. 14 shows the data flow for payload to TSI, SSI or MI according to one embodiment.
Figure 21:
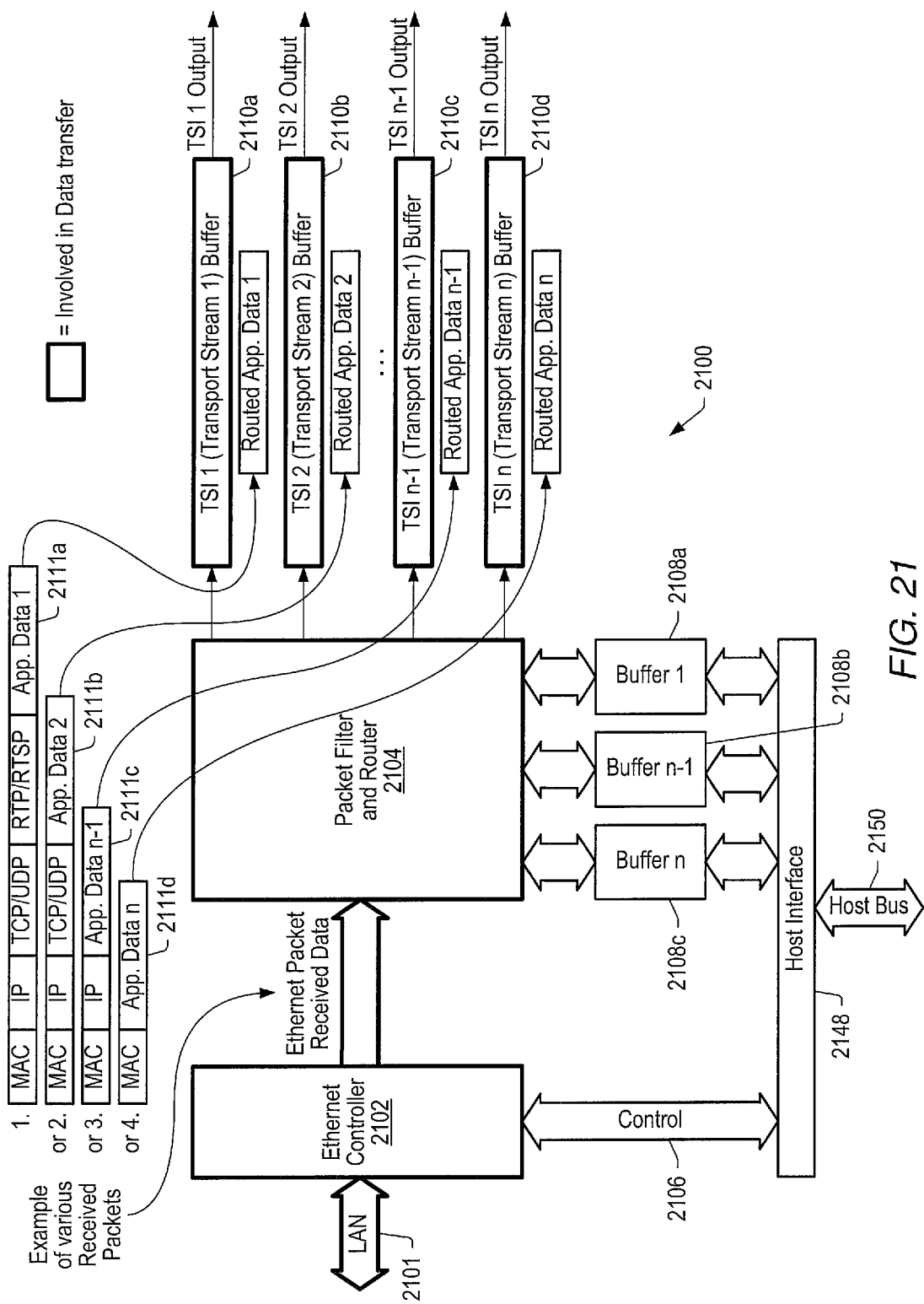
FIG. 21 illustrates one embodiment where filtered packets are routed to TSI outputs while headers get discarded.

Payload router 1306 may be used to decide whether the payload is routed to TSI 1316 or SSI/MI 1318. FIG. 14 illustrates the flow structure for embodiments where only payload router 1406 (representing payload router 1306 from FIG. 13 in FIG. 14) is used, in which case the header is discarded. The heavily outlined path in FIG. 14 illustrates the flow for this case. As shown, MAC/PHY 1402 may receive a packet, which may be filtered by filter 1404, and routed by payload router 1406 to TSI 1416 and/or to SSI/MI 1418. Correspondingly, FIG. 21 shows a rendition of the embodiment of packet processing circuit 402 according to FIG. 5, highlighting the components that are involved in packet transfer when filtered packets are routed to TSI outputs while headers get discarded, according to the flow structure of FIG. 14. Ethernet controller 2102 may pass the data received over LAN 2101 to packet filter and router 2104. As shown in FIG. 21, TSI interface buffers 2110a-2110d allow the processing of individual headers and payload for each packet 2111a-2111d. The headers may be discarded and the application data or payload may be routed to the TSI ports. As also shown, in one embodiment, TSI buffers or FIFOs 2110a-2110d store the payload data before it is passed to the TSI output. Buffering may or may not be required based on the ability of the entire system to establish a constant bit rate equivalent to the framing rate of the data-consuming device at the TSI output. As seen in FIG. 21, the headers (shown in the context of Ethernet packets that have a "MAC" or "MAC and IP" or "MAC, IP, UDP and RTP" header and other variations) may be stripped and the application data may be passed to the TSI.

Figure 15:
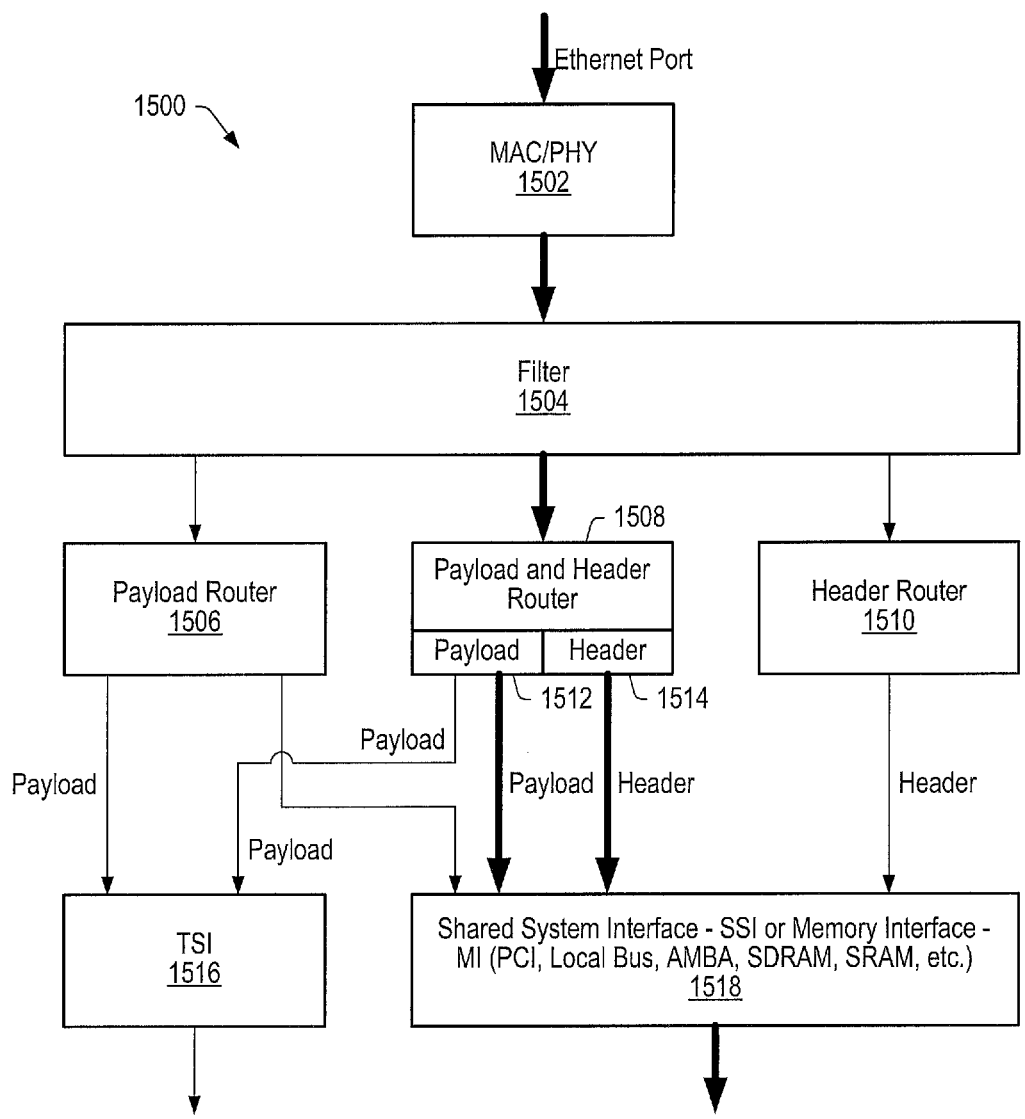
FIG. 15 shows the data flow for payload and header(s) to TSI, SSI or MI according to one embodiment.

FIG. 15 illustrates the flow structure for embodiments where the payload and header router 1508 (representing payload and header router 1308 from FIG. 13 in FIG. 15) routes both the payload and header to SSI and/or MI 1518 (representing payload and header router 1318 from FIG. 13 in FIG. 15). The heavily outlined path in FIG. 15 illustrates the flow for this case. As shown, MAC/PHY 1502 may receive a packet, which may be filtered by filter 1504, and routed by payload and header router 1508 to SSI/MI 1518. As shown in FIG. 15, payload 1512 and header 1514 are routed distinctly to SSI/MI 1518. In a way, the flow structure shown in FIG. 15 allows Ethernet packets to be routed to a Host system in their entirety. In certain embodiments, the packets that match the filter criteria (when processed by filter 1504) may comprise packets that are not specific to any particular application type. Referring back to FIG. 5, in embodiments where packet processing circuit 402 is configured to have all packets routed to host interface 548 and not utilize TSI interface 510a-510d, the flow structure shown in FIG. 15 may be utilized.

Figure 16:
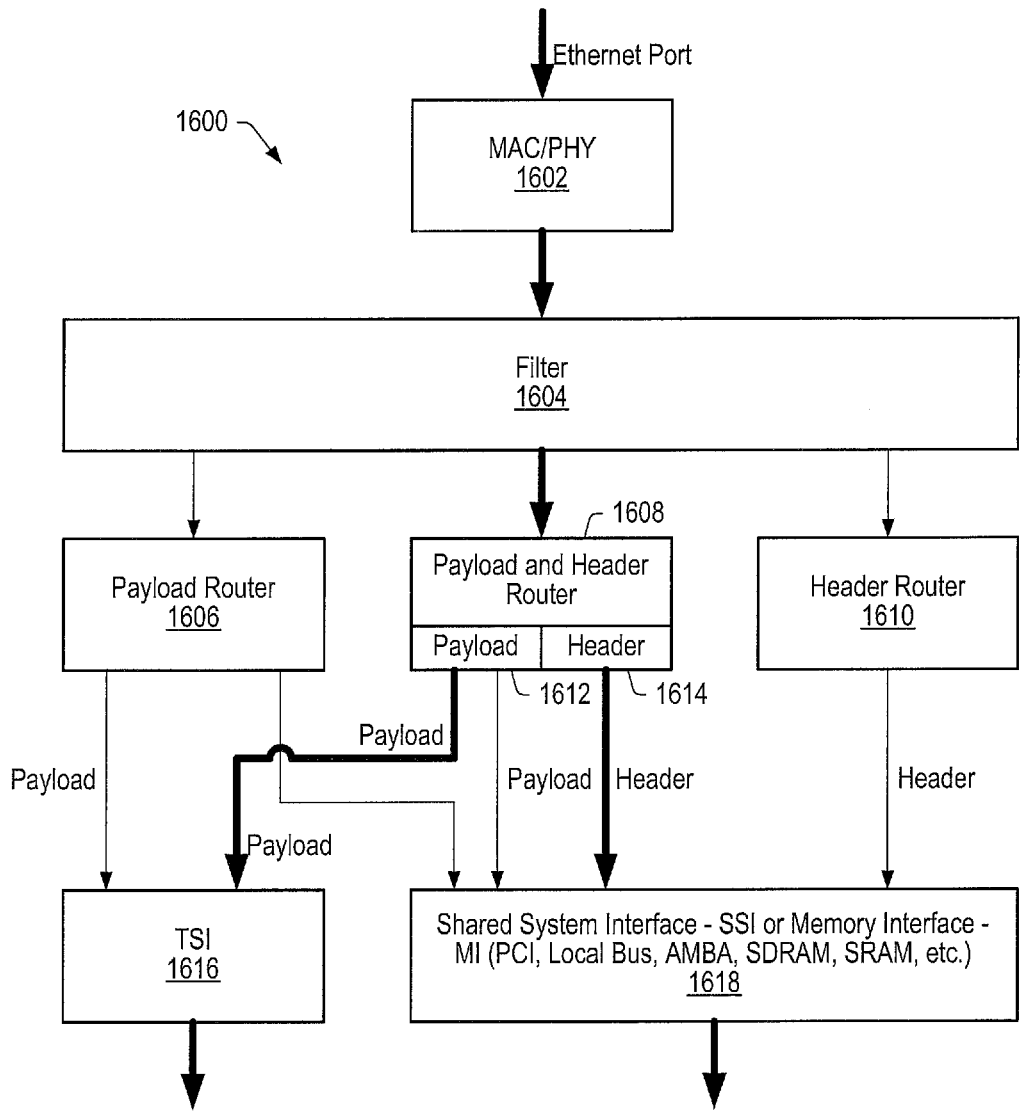
FIG. 16 shows the data flow for payload to TSI and header(s) to SSI or MI according to one embodiment.
Figure 22:
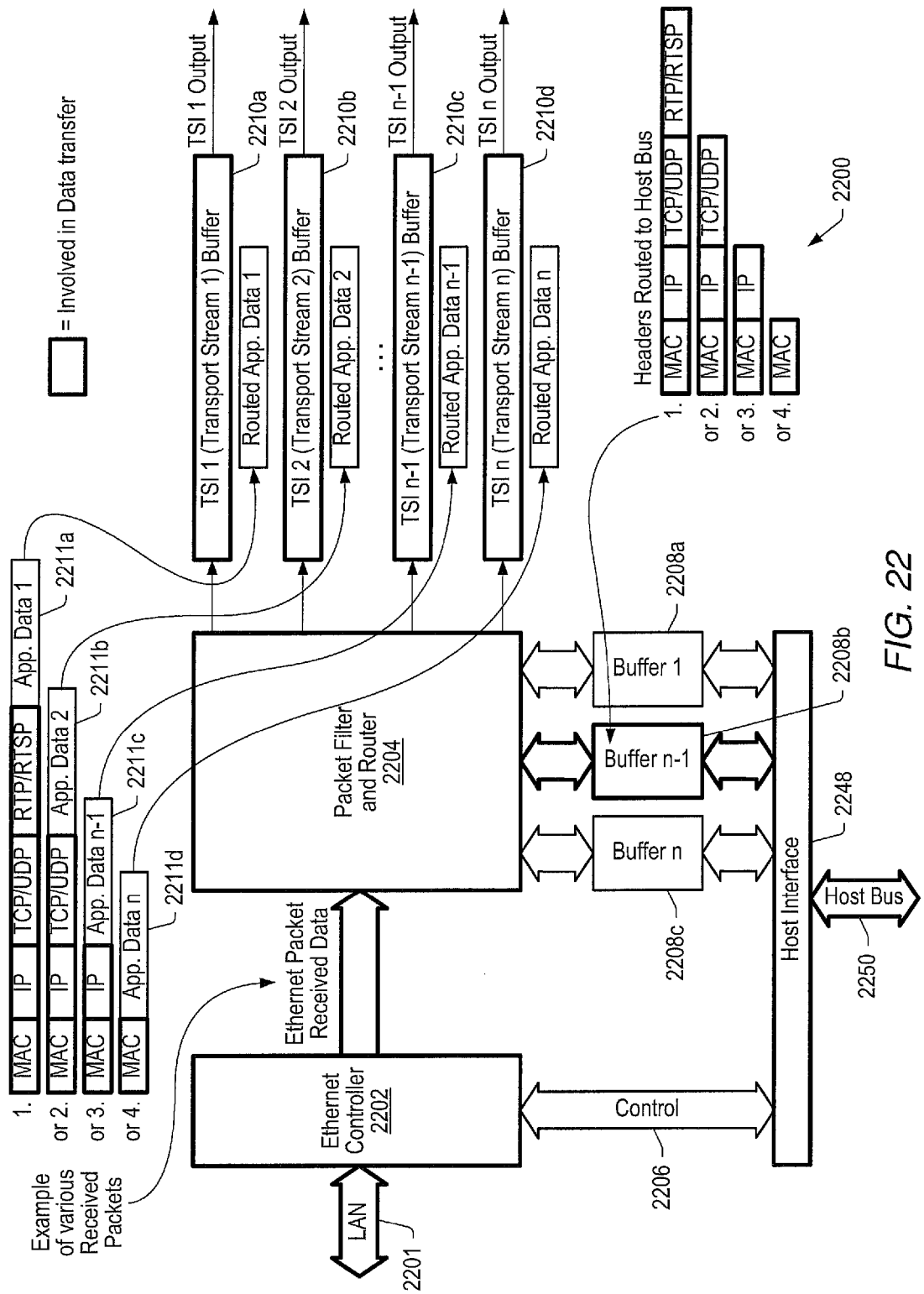
FIG. 22 illustrates one embodiment where filtered packets are routed to TSI outputs while headers are routed to a host bus via host receive buffers.

In preferred embodiments, the header will not be routed to TSI 1516, while the payload may be routed to either the TSI 1516 or SSI/MI 1518. FIG. 16 illustrates the flow structure for embodiments where the payload is routed to TSI 1616 (representing TSI 1316 from FIG. 13 in FIG. 16) while the associated header is routed to SSI/MI 1618 (representing SSI/MI 1318 from FIG. 13 in FIG. 16). Correspondingly, FIG. 22 shows a rendition of the embodiment of packet processing circuit 402 according to FIG. 5, highlighting the components that are involved in packet transfer when payload is routed to TSI outputs 2210a-2210c, while headers are routed to host bus 2250 through one of receive buffers 2208a-2208c via host interface 2248, according to the flow structure of FIG. 16. As an implementation or programmed option shown in FIG. 22, the payload that is routed to TSI outputs 2210a-2210c, may or may not contain encrypted data. As an implementation or programmed option shown in FIG. 22, Ethernet Controller 2202 may pass the Ethernet packet that went through MAC layer filtering of either a unique IEEE 802.3 6-byte individual, Multicast or group Multicast address. The packet may be parsed in PFR 2204 for the appropriate header information at one or more of the layers, which may comprise network, transport and/or application layers. In one embodiment, the application data or data payload (from packets 2211a-2211d) is stripped and/or routed to one or more of TSI ports 2210a-2210d. The corresponding header or headers (also from packets 2211a-2211d) are passed to host bus 2250 via SSI/MI 2248 using, as depicted in FIG. 22, buffer 2208b. The buffering as shown in FIG. 22 is optional, and cut-through or store-and-forward methodology may be used depending on the overall system architecture trade-offs, previously enumerated.

Figure 23:
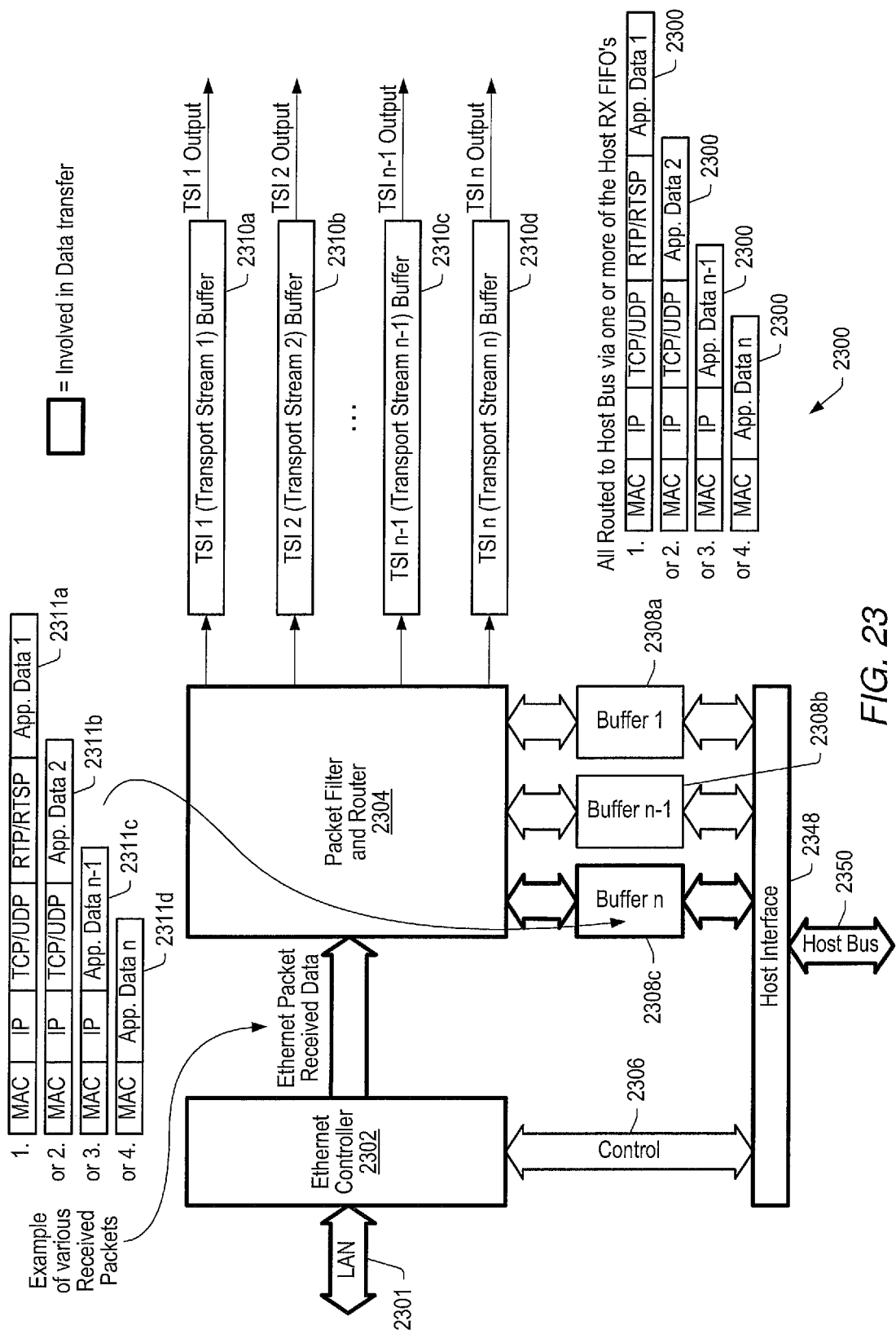
FIG. 23 illustrates one embodiment where all non-matched, non-application specific packets are routed to a host interface via host receive buffers.

In one set of embodiments, all Ethernet packets that do not match any of the filtered criteria may be routed through the same path. FIG. 23 shows a rendition of the embodiment of packet processing circuit 402 according to FIG. 5, highlighting the components that are involved in packet transfer when packets that do not match any of the filtered criteria are routed through the same path. As seen in FIG. 23, any of packets 2311a-2311d that are non-matched and non-application specific may be routed to host interface 2348 via buffer 2308c.

Figure 24:
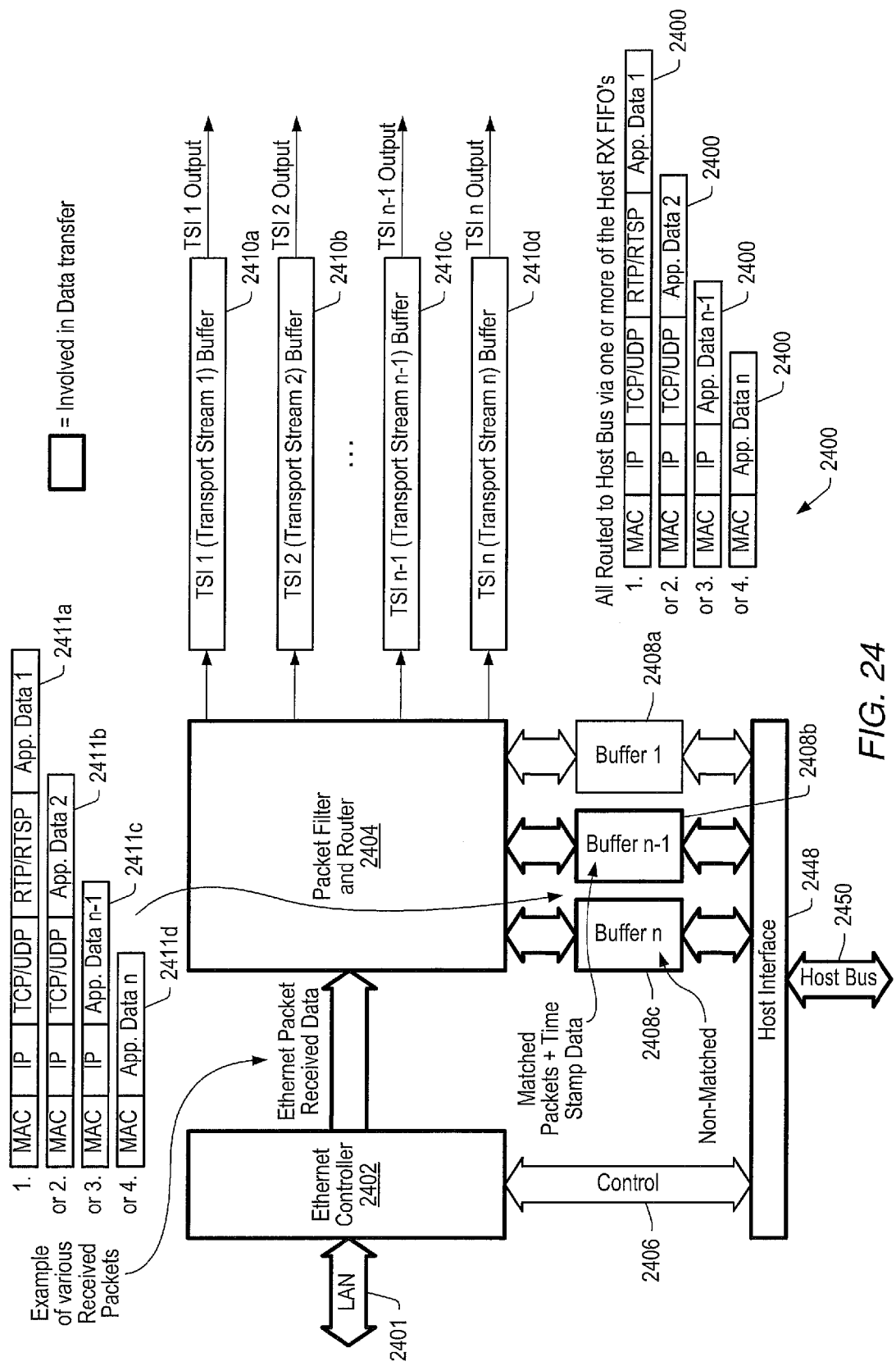
FIG. 24 illustrates one embodiment where all non-matched packets are routed to a host interface via host receive buffers and matched packets are routed to host receive buffers.

FIG. 24 shows a rendition of the embodiment of packet processing circuit 402 according to FIG. 5, highlighting the components that are involved in packet transfer when non-matched packets are placed in buffer 2408c and matched packets are placed in buffer 2408b. In certain embodiments, the utilization of multiple buffers or FIFOs (2408a-2408c), may enable the host system to create priority queues in which specific Ethernet Packets with varying header types, IP, UDP, TCP, or application packet types may be routed to the associated host port. This may allow processing of individual Ethernet packets to be prioritized by the host system. As an implementation or programmed option shown in FIG. 23, the payload that is routed to Host Bus 2350 may or may not contain encrypted data.

Figure 17:
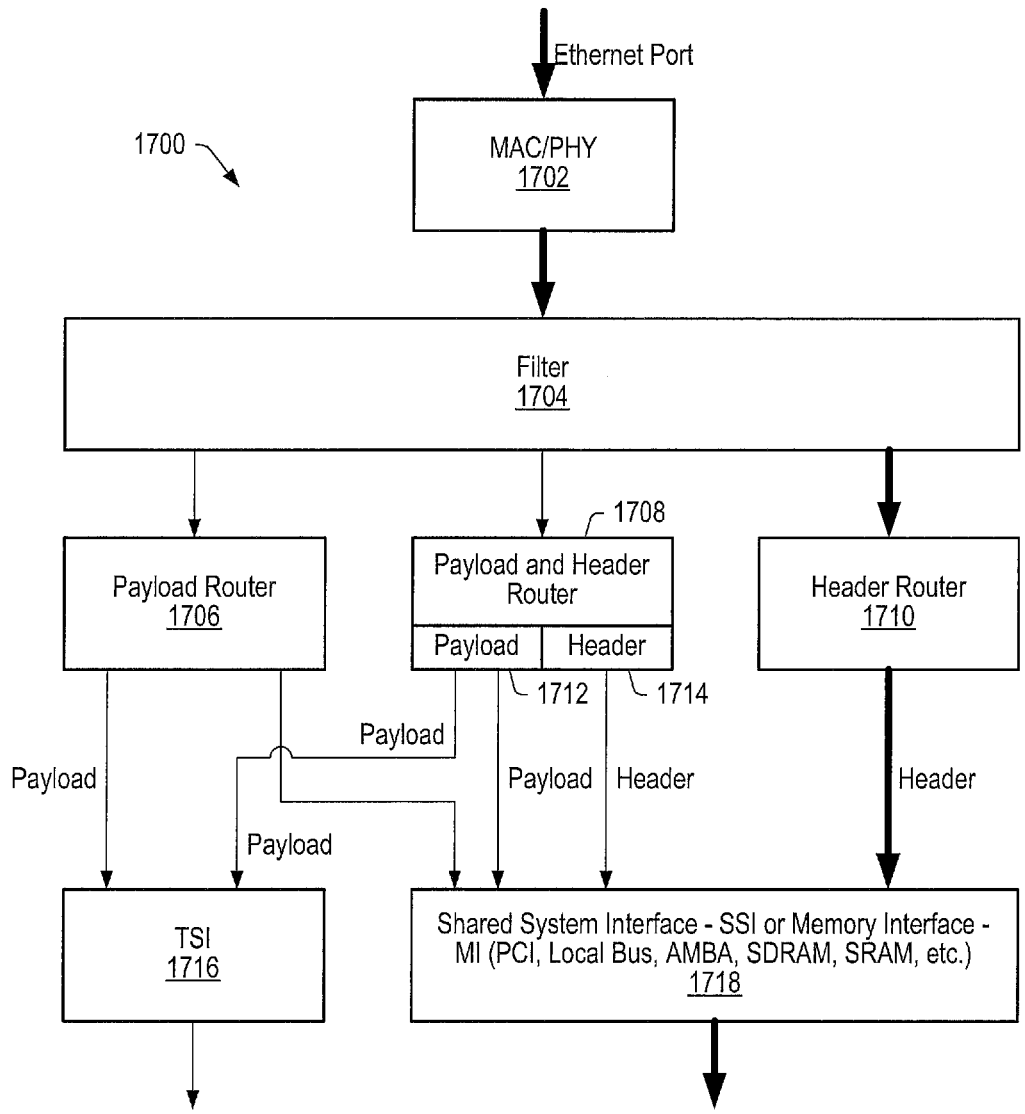
FIG. 17 shows the data flow for header(s) to SSI or MI according to one embodiment.

FIG. 17 illustrates the flow structure for embodiments where the Ethernet data headers are routed to the host interface and the payload data is discarded. Header router 1714 (representing header router 1314 from FIG. 13 in FIG. 17) may be used to route the header or headers of the Ethernet packet—received by MAC/PHY 1702 and filtered by filter 1704—to SSI/MI 1718 (representing SSI/MI 1318 from FIG. 13 in FIG. 17). This may be performed when the payload is not required for a given application. In one set of embodiments, the flow structure illustrated in FIG. 17 may be used for diagnostic and performance optimization. The header information may be used for statistical information, and the payload, since it is being discarded, will not incur additional host processing.

Figure 18:
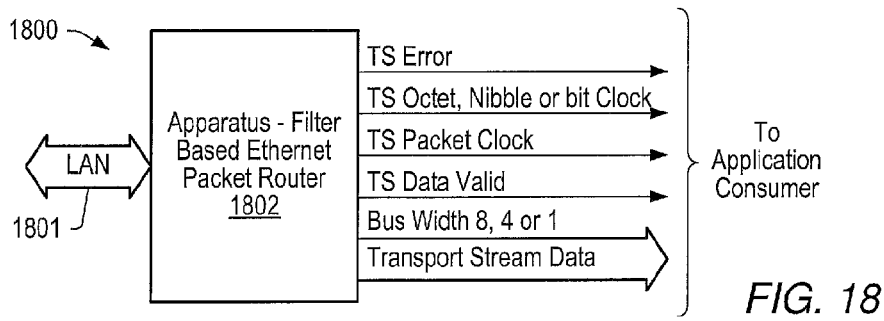
FIG. 18 shows the definition of transport stream signals according to one embodiment.
Figure 19:
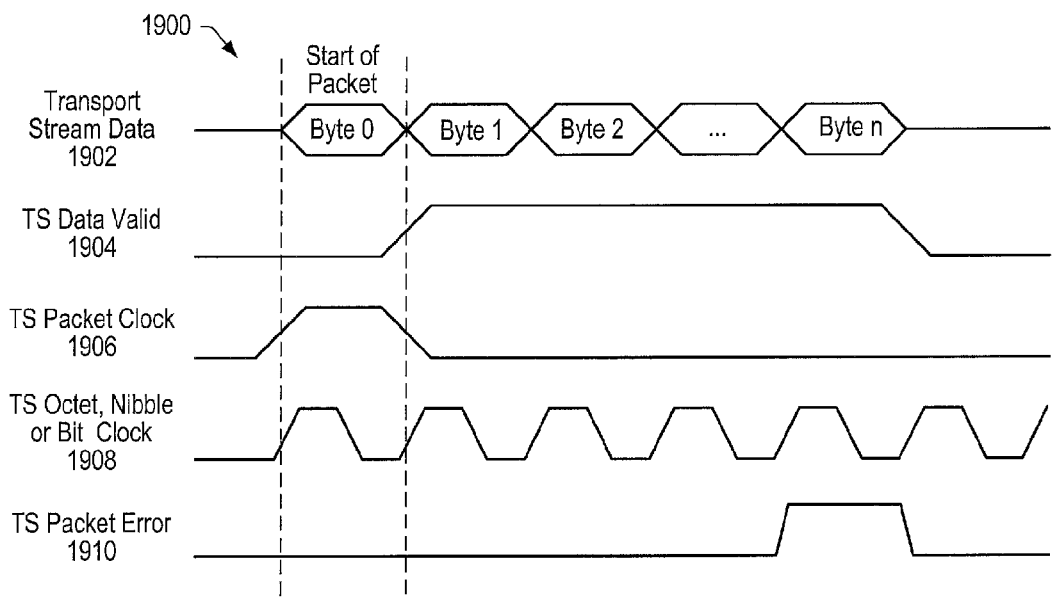
FIG. 19 shows transport stream signal timing according to one embodiment.

FIG. 18 describes the transport stream signal interface according to one embodiment. The interface in FIG. 18 may be designed to handle data streaming, and represents a non-standard interface. In one set of embodiments, streaming video and audio data may be transferred over this interface. As shown in FIG. 18, the signals comprise a TS Error output, TS Packet Clock, TS (Octet, nibble or bit) Clock, and TS Data Valid, as well as the Transport Stream Data, which may be in the form of, but not limited to, a serial bit stream, 4-bit (nibble) or 8-bit (Byte) connection. The timing and relationship of these signals according to one embodiment is outlined in FIG. 19. As mentioned above, transport stream data 1902 may be delivered using a serial bit stream, 4-bit (nibble) or 8-bit (Byte) type bus connection. In FIG. 19, "Byte0, Byte1, Byte2, . . . ByteN" may indicate the transport stream data bus width being 8 bits. For Nibble or Serial bus widths, this may be designated as "Nibble0, Nibble1, . . . NibbleN" and "Bit0, bit1, . . . bitN", respectively. The rising (in this case asserting) edge of TS Packet Clock 1906 may indicate the first 8-bit (Byte), 4-bit (Nibble) or bit of the packet or frame. A packet in this context may not necessarily mean an Ethernet Packet, but the start of a data payload byte at the beginning of, or offset from the start of, an Ethernet data payload. In one embodiment, TS Packet Clock 1906 is a synchronous clock that runs at specific frequencies based on a given application. In case of video applications, for example MPEG2, the clock rate of TS Packet Clock 1906 for serial data may be 27 MHz. At nibble or Byte bus widths, the frequency may be less. TS Data Valid signal 1904 may be used to determine the start and end of a packet or frame. TS Data Valid 1904 may be asserted on the first byte of the packet or frame and de-asserted on the last byte. TS Packet Error signal 1910 may be used to flag erroneous data or errors in reception of Transport Stream data 1902. The data comprised in Transport Stream data 1902 may be ignored when TS Packet Error signal 1910 is asserted during the falling edge of TS Packet Clock 1906.

Figure 20:
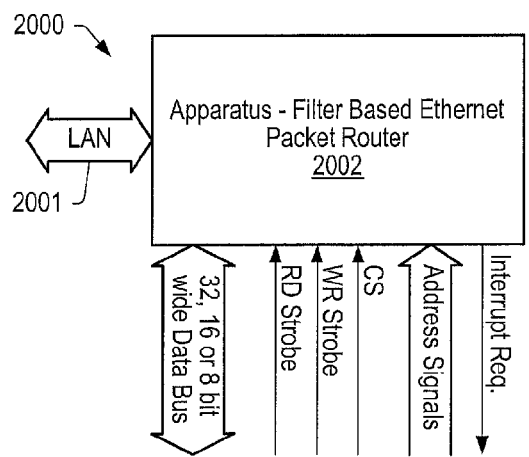
FIG. 20 shows the definition of local bus signals according to one embodiment.

Referring back to FIG. 5, host interface 548 comprised in packet processing circuit 402 may function as a communication bus between packet processing circuit 402 and a Host System (for example STB/PVR SOC 406 in FIG. 4) coupled to packet processing circuit 402. In one set of embodiments, standard bus architectures may be used to implement host interface 548. Examples of standard bus architectures that may be used include PCI, VCI, PVCI, AHB, ASB, APB, Cardbus, and Local Bus. In addition, Memory Bus architectures such as DDR, DDR2, SDRAM, SRAM, FLASH RAM, and SSRAM may also be used. As an example, signals for a standard "Local Bus" are shown in FIG. 20.

Although the embodiments above have been described in considerable detail, other variations for data transfers over communications channels other than Ethernet are possible. Furthermore, numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method for delivering data, the method comprising:
   receiving an Ethernet packet targeted to a host processing unit;
   filtering the Ethernet packet, comprising identifying routing information corresponding to the Ethernet packet;
   routing according to the routing information at least a first portion of the Ethernet packet to the host processing unit via a transport stream interface (TSI);
   wherein the Ethernet packet comprises one or more encapsulation headers according to Ethernet protocol, and wherein said identifying the routing information is performed using information obtained from the one or more encapsulation headers.

2. The method of claim 1, wherein the TSI is a dedicated interface comprising:
   an error signal;
   a data valid signal;
   a packet clock signal;
   a transport stream data bus; and one of:
   an octet clock signal;
   a nibble clock signal; and
   a bit clock signal;
   wherein the transport stream data bus is configured for the transfer of one or more of:
   an 8-bit transport stream;
   a 4-bit transport stream; and
   a serial transport stream.

3. The method of claim 1, wherein said receiving the Ethernet packet comprises receiving the Ethernet packet over a single physical Ethernet connection.

4. The method of claim 1, wherein said identifying the routing information comprises identifying a first destination port, wherein said routing at least a first portion of the Ethernet packet to the host processing unit via the TSI comprises routing at least the first portion of the Ethernet packet to the first destination port via the TSI.

5. The method of claim 1, the encapsulation headers comprise one or more of:
   MAC layer header;
   network layer header;
   transport layer header; and
   application layer header.

6. The method of claim 5, wherein the network layer header comprises IP header information, and wherein the transport layer header comprises one or more of:
   TCP header information; and
   UDP header information; and
   wherein the application layer header comprises one or more of:
   HTTP header information;
   RTP header information;
   RTSP header information;
   FTP header information; and
   TFTP header information.

7. The method of claim 1, wherein the TSI is configured for one of:
   transferring real-time data; and
   transferring non-real-time data.

8. The method of claim 7, wherein said receiving, said filtering and said routing are performed for a plurality of Ethernet packets.

* * * * *